(12) United States Patent
Tsukamoto et al.

(10) Patent No.: US 10,017,135 B2
(45) Date of Patent: Jul. 10, 2018

(54) BRANCHING STRUCTURE AND WIRE HARNESS

(71) Applicant: YAZAKI CORPORATION, Tokyo (JP)

(72) Inventors: Masashi Tsukamoto, Shizuoka (JP); Shingo Kambara, Shizuoka (JP); Yoshihiko Sano, Shizuoka (JP); Motoko Hara, Shizuoka (JP); Takashi Okawa, Shizuoka (JP); Mai Shimizu, Shizuoka (JP); Satoshi Saitou, Shizuoka (JP); Akihiro Takagi, Shizuoka (JP); Masahiro Ichikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/793,883

(22) Filed: Oct. 25, 2017

(65) Prior Publication Data

US 2018/0118138 A1 May 3, 2018

(30) Foreign Application Priority Data

Oct. 27, 2016 (JP) .................................. 2016-210511

(51) Int. Cl.
*H01R 9/03* (2006.01)
*B60R 16/02* (2006.01)
(Continued)

(52) U.S. Cl.
CPC ........ *B60R 16/0215* (2013.01); *B60R 16/023* (2013.01); *B60R 16/03* (2013.01);
(Continued)

(58) Field of Classification Search
CPC .............. H01R 13/501; H01R 2103/00; H01R 13/6608; H01R 4/185; H01R 4/64;
(Continued)

(56) References Cited

U.S. PATENT DOCUMENTS 2,411,018 A * 11/1946 Benander ............... H02G 3/083
174/59
2,445,604 A * 7/1948 Clayton .................. H01R 24/76
138/129
(Continued)

FOREIGN PATENT DOCUMENTS

JP       2015-227089 A     12/2015

*Primary Examiner* — Abdullah Riyami
*Assistant Examiner* — Vladimir Imas
(74) *Attorney, Agent, or Firm* — Kenealy Vaidya LLP

(57) ABSTRACT

A branching structure for connecting a branch harness to a main line harness, includes connection terminals configured to electrically connect branch lines of the branch harness to main lines of the main line harness respectively, a terminal block on which the connection terminals are supported, and fasteners that respectively fasten the connection terminals onto the terminal block. Each of the connection terminals has a belt-shaped wound portion to be wound around a corresponding one of the main lines. The wound portion is fastened by a corresponding one of the fasteners so that both ends of the wound portion come closer to each other and a center portion of the wound portion tightens around the main line so as to be brought into surface contact with a bar conductor of the main line.

2 Claims, 18 Drawing Sheets

(51) Int. Cl.
   *B60R 16/023* (2006.01)
   *B60R 16/03* (2006.01)
   *H01B 7/00* (2006.01)
   *H01R 13/66* (2006.01)
   *H02G 3/04* (2006.01)
   *H02G 3/06* (2006.01)

(52) U.S. Cl.
   CPC ....... H01B 7/0045 (2013.01); H01R 13/6691 (2013.01); *B60R 16/0222* (2013.01); *H02G 3/0481* (2013.01); *H02G 3/06* (2013.01)

(58) Field of Classification Search
   CPC .... H01R 13/6691; H01B 7/0045; H02G 3/06; B60R 16/03; B60R 16/0215
   USPC ................. 439/658, 659, 419, 449
   See application file for complete search history.

(56) References Cited

U.S. PATENT DOCUMENTS

| | | | | |
|---|---|---|---|---|
| 2,700,752 | A * | 1/1955 | Cataldo | H01R 25/006 439/650 |
| 2,710,949 | A * | 6/1955 | Happe | H01R 24/66 439/658 |
| 4,159,157 | A * | 6/1979 | Koehler | F21V 21/002 439/194 |
| 5,556,297 | A * | 9/1996 | Bray | H01R 4/2404 439/405 |
| 5,971,799 | A * | 10/1999 | Swade | B60R 16/0207 439/502 |
| 6,019,627 | A * | 2/2000 | Embo | H01R 4/2433 439/405 |
| 6,291,770 | B1 * | 9/2001 | Casperson | B60R 16/0207 174/139 |
| 6,394,849 | B2 * | 5/2002 | Kasai | H01R 9/2458 439/655 |
| 6,469,404 | B1 * | 10/2002 | Pohjola | H02J 13/0003 307/10.1 |
| 6,716,055 | B1 * | 4/2004 | Echito | H01R 4/2404 439/417 |
| 6,837,598 | B2 * | 1/2005 | Marcus | F21S 8/032 362/235 |
| 6,971,904 | B2 * | 12/2005 | Wallmeier | H01R 4/2454 439/417 |
| 6,972,375 | B2 * | 12/2005 | Sugaya | H01R 23/661 174/100 |
| 7,207,847 | B2 * | 4/2007 | Nagai | B60Q 3/74 439/419 |
| 7,217,012 | B2 * | 5/2007 | Southard | G09F 9/33 362/240 |
| 7,356,714 | B2 * | 4/2008 | Nagasawa | H01R 13/665 701/54 |
| 8,062,056 | B2 * | 11/2011 | Lee | H01R 4/2433 439/395 |
| 8,257,106 | B2 * | 9/2012 | Fornage | H01R 13/639 439/304 |
| 8,613,625 | B2 * | 12/2013 | Costa | H01R 4/2433 439/116 |
| 9,545,887 | B2 * | 1/2017 | Ito | B60R 16/0207 |
| 9,545,888 | B2 * | 1/2017 | Ito | B60R 16/023 |
| 9,570,212 | B2 * | 2/2017 | Sato | B60R 16/0207 |
| 9,653,894 | B2 * | 5/2017 | Kitamura | H02G 3/0406 |
| 9,672,959 | B2 * | 6/2017 | Sakaki | B60R 16/0207 |
| 9,776,582 | B2 * | 10/2017 | Kamenoue | B60R 16/027 |
| 9,793,031 | B2 * | 10/2017 | Sakaki | H01B 7/16 |
| 9,799,427 | B2 * | 10/2017 | Kanagawa | H01B 7/1805 |
| 9,815,421 | B2 * | 11/2017 | Yamaguchi | B60R 16/0207 |
| 2004/0223275 | A1 * | 11/2004 | Yanagida | H02J 13/0003 361/62 |
| 2004/0230320 | A1 * | 11/2004 | Nagasawa | H01R 13/665 700/1 |
| 2009/0304913 | A1 * | 12/2009 | Yanagawa | B05B 12/20 427/117 |
| 2010/0088004 | A1 * | 4/2010 | Maki | H02G 3/086 701/102 |
| 2011/0301782 | A1 * | 12/2011 | Yamamoto | B60N 2/002 701/1 |
| 2012/0221201 | A1 * | 8/2012 | Aoki | B60R 16/02 701/36 |
| 2013/0285549 | A1 * | 10/2013 | Aoki | B60R 16/0207 315/79 |
| 2014/0103715 | A1 * | 4/2014 | Ito | B60R 16/0207 307/24 |
| 2015/0349471 | A1 | 12/2015 | Maki et al. | |

* cited by examiner

BRANCHING STRUCTURE AND WIRE HARNESS

CROSS REFERENCE TO RELATED APPLICATIONS

This application is based on Japanese Patent Application (No. 2016-210511) filed on Oct. 27, 2016, the contents of which are incorporated herein by reference.

BACKGROUND OF THE INVENTION

1. Field of the Invention

The present invention relates to a branching structure and a wire harness.

2. Description of the Related Art

For example, in a vehicle wire harness, a main line harness into which main lines such as a power line and a grounding line are collected is connected to branch harnesses to be connected to respective electrical components. As a technique to branch a main line harness by connection of a branch harness, there is a technique in which a branching mechanism having press-contacting terminals is used to connect a main line of a main line harness to a branch line by establishing a press-contacting connection between the press-contacting terminals of the branching mechanism and the main line (see, for example, JP-A-2015-227089).

In the above-described branching mechanism having the press-contacting terminals, the press-contacting connection is established by pushing the main line between a pair of press-contacting blades, and hence, the press-contacting blades are disposed on both sides of the main line. Therefore, when the pair of press-contacting blades is used to branch the branch harness, a distance between main lines disposed in parallel in the main line harness is increased, which increases the occupied space of the branching mechanism.

Besides, in the branching structure using a press-contacting terminal, an electrical line is pushed in between press-contacting blades to be brought into contact, and therefore, in a main line such as a power line through which a large current flows, it is apprehended that connection reliability may be lowered because the contact area is insufficient.

Furthermore, in recent years, a rigid wire having a single line of aluminum or the like has started to be used as a main line of a main line harness of a vehicle wire harness for purposes of weight reduction, handleability improvement and the like. Press-contacting blades of a press-contacting terminal are, however, difficult to cut into the single line of the rigid wire due to the rigidity of the rigid wire, and hence, there is a demand for a branching structure replaceable with the branching structure using the branching mechanism having the press-contacting terminals.

SUMMARY OF THE INVENTION

The present invention is accomplished in consideration of the above-described circumstances, and an object of the present invention is to provide a branching structure and a wire harness capable of attaining high connection reliability while saving the occupied space of the branching mechanism.

In order to achieve the above-described object, the branching structure and the wire harness of the present invention have the following features (1) and (2):

(1) A branching structure for connecting a branch harness to a main line harness, wherein the branch harness includes a plurality of branch lines and the main line harness includes a plurality of main lines arranged in parallel to each other and each made of a wiring member including a bar conductor, the branching structure including: connection terminals configured to electrically connect the branch lines to the main lines respectively; a terminal block on which the connection terminals are supported; and fasteners that respectively fasten the connection terminals onto the terminal block, wherein: each of the connection terminals has a belt-shaped wound portion to be wound around a corresponding one of the main lines, and the wound portion is fastened by a corresponding one of the fasteners so that both ends of the wound portion come closer to each other and a center portion of the wound portion tightens around the main line so as to be brought into surface contact with the bar conductor of the main line.

(2) A wire harness including: control boxes each of which comprises a control portion and the branching structure according to (1) described above; the main line harness including a power line having a prescribed current capacity and routed on a vehicle body; and the branch harness configured to be connected to an accessory of a vehicle, wherein: the control part of each of the control boxes distributes power of the power line supplied to the main line harness to the branch harness connected to the main line harness, the control boxes are dispersedly disposed along the main line harness, and each of the control boxes connects the branch harness to the main line harness by using a corresponding one of the branching structures.

In the branching structure as described in (1) above, when the both ends of the belt-shaped wound portion wound around the main line are fastened onto the terminal block by the fastener, the wound portion is brought into surface contact with the whole circumferential surface of the main line to be electrically connected. Accordingly, protrusion of a connecting portion between the main line and the connection terminal along an arranging direction can be suppressed to an extend corresponding to the thickness of the wound portion. As a result, the distance between the main lines can be made as small as possible, so as to save the space in the branching portion.

Besides, since the wound portion wound around the main line is brought into surface contact with the circumferential surface of the main line, a large contact area can be attained, and hence high connection reliability can be attained.

According to the wire harness of (2) described above, space can be saved in a portion, connected to the branch harness, of the main line harness routed, for example, along the backbone of a vehicle body, and high connection reliability can be attained.

According to the present invention, a branching structure and a wire harness capable of attaining high connection reliability while saving space can be provided.

The present invention has been briefly described so far, and the present invention will be clarified in more details by reading the following aspects for practicing the present invention (hereinafter referred to as "embodiments") with reference to the accompanying drawings.

BRIEF DESCRIPTION OF THE DRAWINGS

FIG. 13A is a cross-sectional view thereof, taken along an arranging direction of main lines, before connection, and FIG. 13B is a cross-sectional view thereof, taken along the arranging direction of the main lines, after the connection.

FIG. 19A is a cross-sectional view thereof before connection and FIG. 19B is a cross-sectional view thereof after the connection.

DETAILED DESCRIPTION OF THE EXEMPLARY EMBODIMENTS

Preferred embodiments of the present invention will now be described with reference to the accompanying drawings.

First, the structure of a wire harness according to an embodiment of the present invention will be described.

Figure 1:
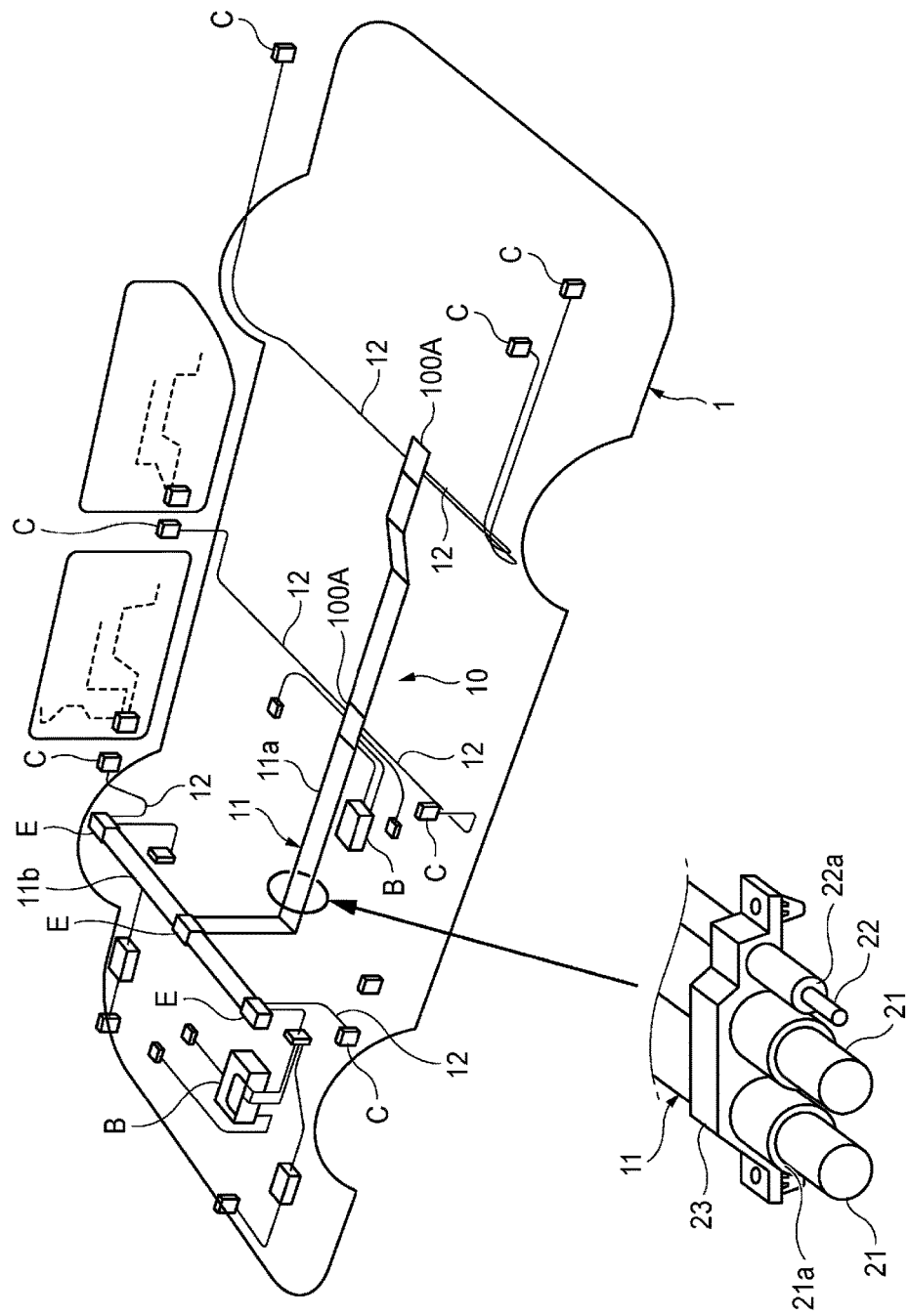
FIG. 1 is a schematic perspective view of a vehicle body in which a wire harness according to an embodiment of the present invention is routed.

FIG. 1 is a schematic perspective view of a vehicle body in which the wire harness of the present embodiment is routed.

As illustrated in FIG. 1, the wire harness 10 is used as, for example, a power supply path for supplying power of a power source B, such as a vehicle's main or sub battery, to electrical components, that is, accessories of various parts of a vehicle body 1, or a signal transmission path necessary for sending/receiving signals to/from electrical components.

The wire harness 10 includes a main line harness 11 and a plurality of branch harnesses 12. The main line harness 11 is constructed by bundling, with a fixing member 23, main lines 21, such as a power line and a grounding line, and signal lines 22, such as a communication line and a signaling line, arranged in parallel to one another. The main line harness 11 is formed in a simple shape like a backbone of the vehicle body 1. The main line 21 is an electrical line obtained by covering, with a cover (jacket or sheath) 21a, a solid wire of a conductive metal material such as aluminum, and is a rigid wire made of a round bar having a circular cross-section. The main line 21 of the rigid wire made of aluminum has high rigidity as compared with a strand wire formed by twisting a plurality of strands, and is lighter than a copper wire and the like. Besides, the main line 21 of the rigid wire made of aluminum is flexible in all directions and hence is a cable having a high degree of freedom in routing path. It is noted that a signal line 22 can be, for example, a strand wire obtained by coating, with a coating 22a, a core formed by twisting strands of copper, copper alloy or the like.

The main line harness 11 is roughly divided into a floor main line harness 11a and an instrument panel main line harness 11b. The floor main line harness 11a is disposed to extend in the longitudinal direction of the vehicle body 1 in substantially a center portion in the lateral direction of the vehicle body 1 along the vehicle interior floor, and the instrument panel main line harness 11b is disposed straight in the lateral direction to be substantially parallel to a reinforcement in a position along the surface of a dash panel.

Each branch harness 12 is connected to the main line harness 11. The branch harness 12 has a connector C connected to the end thereof, and a connector of an electrical component provided in each part of the vehicle body 1 is connected to the connector C. Besides, the main line harness 11 is connected to various control boxes E. Thus, power is supplied from the power source B and signals are distributed from the control boxes E to the electrical components of the respective parts.

The above-described wire harness 10 is provided with a branch box 100A in each connecting portion between the main line harness 11 and the branch harness 12. This branch box 100A connects the main line harness 11 to the branch harness 12.

Next, a branching structure of the branch box 100A will be described. Herein, the description will be made on the assumption that four branch lines 71 of a branch harness 12 are respectively connected to four main lines 21 arranged in parallel in a main line harness 11.

First Embodiment

Figure 2:
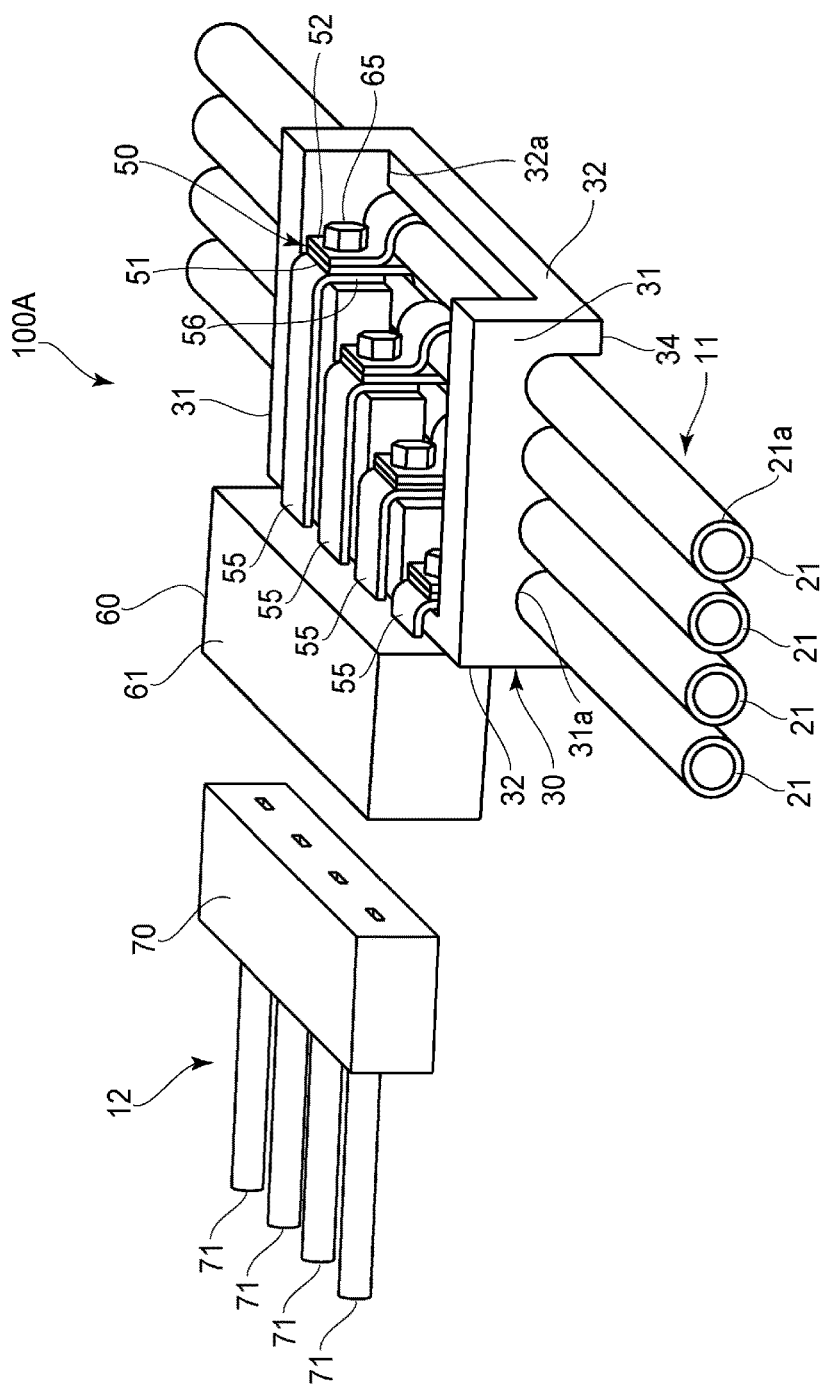
FIG. 2 is a perspective view of a branch box used in a branching structure according to a first embodiment of the present invention.
Figure 3:
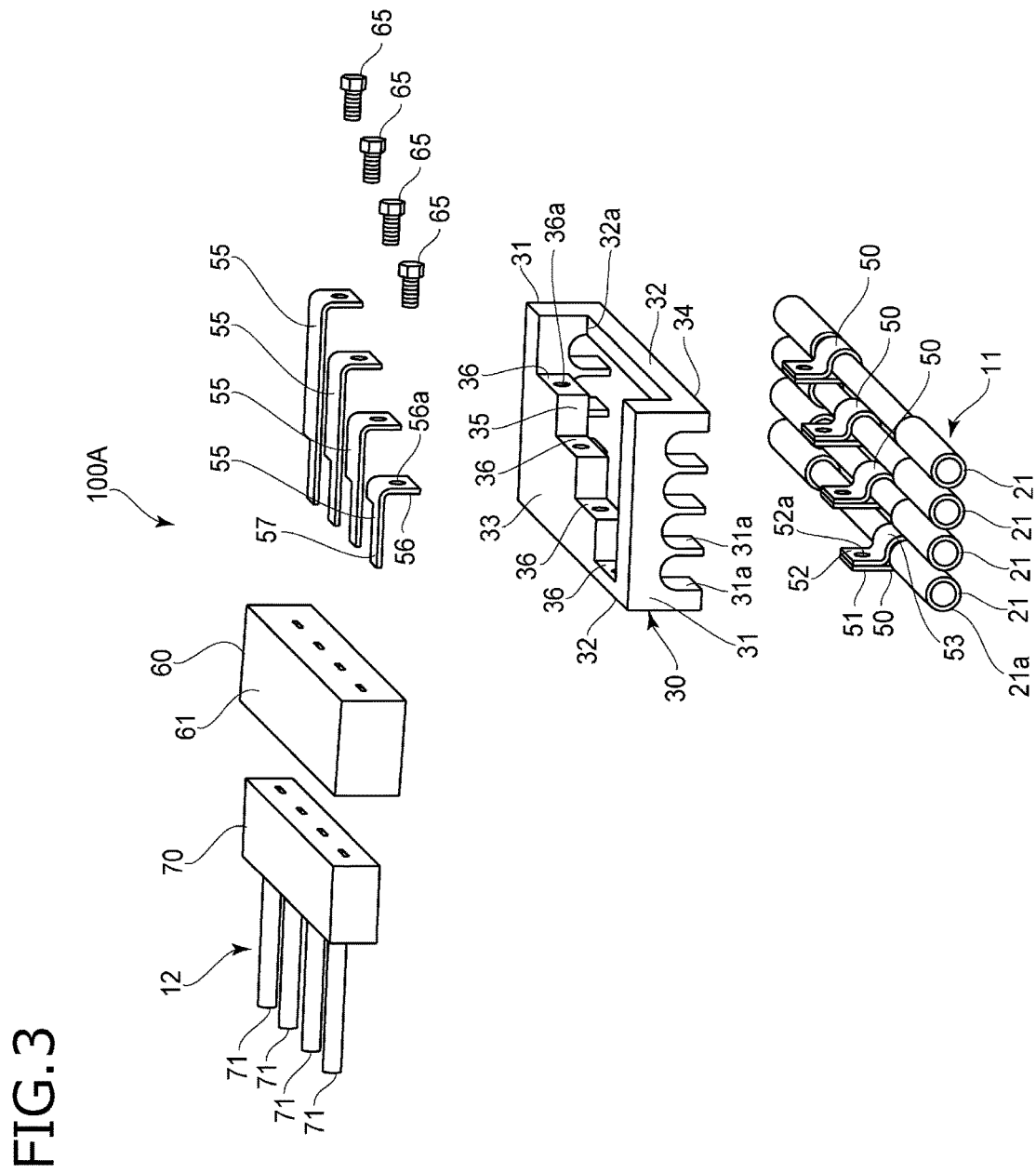
FIG. 3 is an exploded perspective view of the branch box used in the branching structure of the first embodiment.
Figure 4:
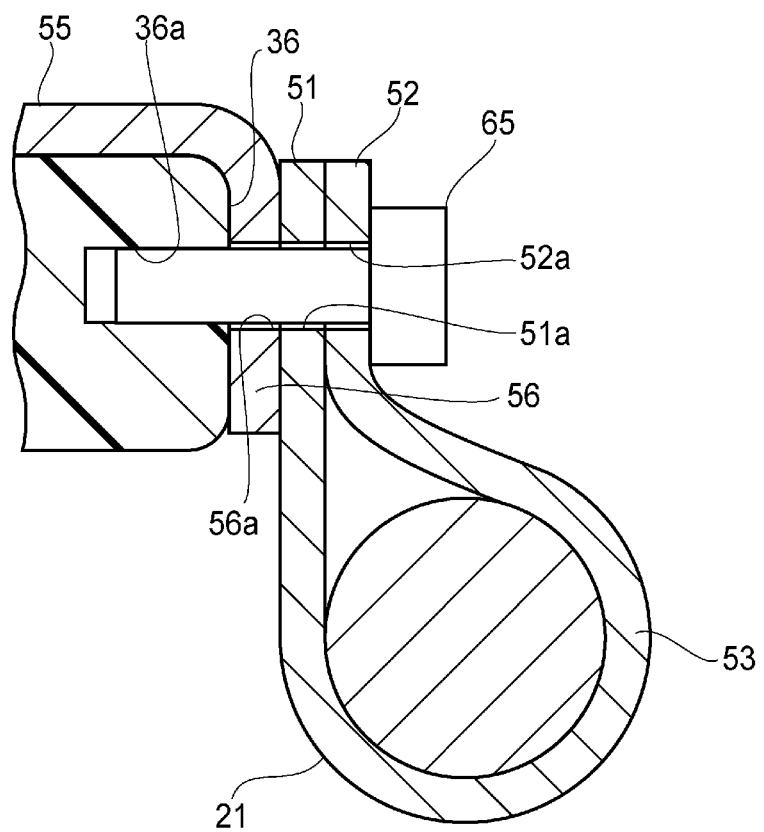
FIG. 4 is a partial cross-sectional view of a connecting portion of the branch box used in the branching structure of the first embodiment.

FIG. 2 is a perspective view of a branch box used in a branching structure according to a first embodiment of the present invention. FIG. 3 is an exploded perspective view of the branch box used in the branching structure of the first embodiment. FIG. 4 is a partial cross-sectional view of a connecting portion of the branch box used in the branching structure of the first embodiment.

As illustrated in FIGS. 2 and 3, the branch box 100A includes a case 30. The case 30 is made of a resin having an insulating property. The case 30 is put on a plurality of (four in the present embodiment) main lines 21 disposed in the main line harness 11. In a portion of the main line harness 11 where the case 30 is put, the cover 21a is removed from each of the main lines 21.

The case 30 is formed in the shape of a block having end surfaces 31, side surfaces 32, an upper surface 33 and a lower surface 34. The case 30 has a terminal block 35, and base surfaces 36 in the same number as that of the main lines 21 are formed on the terminal block 35.

These base surfaces 36 are flat surfaces extending along the lengthwise direction of the main line harness 11, and are disposed at the same pitch as the main lines 21 along the arranging direction of the main lines 21. Besides, these base surfaces 36 are disposed in positions shifted from one another in the lengthwise direction of the main line harness 11. As a result, the terminal block 35 is formed in a step-like shape having the plural base surfaces 36. Each of the base surfaces 36 is provided with a screw hole 36a. The screw hole 36a is provided by insert molding the case 30 with a nut. A fastening screw (a fastener) 65 is screwed into the screw hole 36a. It is noted that the screw hole 36a may be directly formed in the base surface 36.

On the lower surface 34 of the case 30, main line inserting recesses 31a are formed at edges closer to the respective end surfaces 31. These main line inserting recesses 31a are formed in opposing positions, and the main lines 21 are respectively fit in the main line inserting recesses 31a. Besides, on a first one of the side surfaces 32 of the case 30, a recess 32a is formed in a position opposing the base surfaces 36.

The branch box 100A includes connection terminals 50. Each connection terminal 50 is put on each main line 21 of the main line harness 11. Each connection terminal 50 is attached to the portion of the main line 21 where the case 30 of the main line harness 11 is put and where the cover 21a has been removed from the main line 21. The connection terminals 50 are made of a conductive metal material, and are formed by pressing.

As illustrated in FIG. 4, each connection terminal 50 has a fixed end 51 on one end side and a fastening end 52 on the other end side, and these ends respectively have insertion holes 51a and 52a. The connection terminal 50 is formed to have a belt-shaped wound portion 53 between the fixed end 51 and the fastening end 52. The wound portion 53 is formed in a shape swollen in an arc shape on the side of the fastening end 52. The connection terminal 50 is put on the main line 21 with the wound portion 53 wound around the main line 21. When the wound portion 53 is thus wound around the main line 21, a slight gap is formed between the fixed end 51 and the fastening end 52.

Besides, the branch box 100A includes bus bars 55. The bus bars 55 are also made of a conductive metal material and are formed by pressing. Each of the bus bars 55 has, on one end side, a conductive plate portion 56 bent substantially perpendicularly, and an insertion hole 56a is formed in the conductive plate portion 56. The bus bar 55 has a connection pin 57 on the other end side. Each of the bus bar 55 is disposed with the conductive plate portion 56 placed on the corresponding base surface 36 of the terminal block 35 of the case 30, and extends along the arranging direction of the main line harness 11. The connection pin 57 of each bus bar 55 protrudes beyond a second one of the side surfaces 32 of the case 30. The respective bus bars 55 are formed to have different lengths so that the lengths of the connection pins 57 thereof protruding beyond the side surface 32 can be equivalent.

The second side surface 32 of the case 30 is provided with a connector 60. The connector 60 has a housing 61 made of a resin, and the connection pins 57 of the bus bars 55 are inserted into the housing 61 to be housed therein.

Each main line 21 on which the connection terminal 50 is put with the wound portion 53 wound therearound is fit into a corresponding one of the main line inserting recesses 31a of the case 30 from below. Then, each of the connection terminals 50 is disposed in such a manner that the fixed end 51 and the fastening end 52 thereof can be placed on the conductive plate portion 56 of the bus bar 55 disposed on the corresponding base surface 36 of the terminal block 35. In this state, the fastening screw 65 is inserted through the insertion holes 52a, 51a and 56a of the fastening end 52, the fixed end 51 and the conductive plate portion 56 to be screwed into the screw hole 36a provided in the corresponding one of the base surfaces 36 of the terminal block 35. Thus, the conductive plate portion 56, the fixed end 51 and the fastening end 52 are fastened, and the connection terminal 50 and the bus bar 55 are electrically connected to each other.

Besides, when the conductive plate portion 56, the fixed end 51 and the fastening end 52 are fastened by the fastening screw 65, the fixed end 51 and the fastening end 52 of the connection terminal 50 come closer to each other to reduce the gap therebetween. Thus, the wound portion 53 is tightened on the main line 21, and the wound portion 53 is brought into surface contact with the whole circumferential surface of the main line 21. As a result, the connection terminal 50 and the main line 21 are definitely electrically connected to each other.

In the branch box 100A described above, the connector 60 is connected to a branch side connector 70 provided in the branch harness 12. In the branch side connector 70, terminals (not illustrated) respectively connected to ends of the branch lines 71 disposed in the branch harness 12 are housed. When the branch side connector 70 is connected to the connector 60, the terminals provided in the branch side connector 70 are electrically connected to the connection pins 57 of the bus bars 55 of the connector 60. Thus, the branch lines 71 disposed in the branch harness 12 are electrically connected to the main lines 21 of the main line harness 11 via the bus bars 55 and the connection terminals 50.

In this manner, according to the branching structure of the first embodiment using the above-described branch box 100A, the fixed end 51 and the fastening end 52 disposed at the ends of the belt-shaped wound portion 53 wound around the main line 21 are fastened onto the corresponding base surface 36 of the terminal block 35 with the fastening screw 65, and thus, the wound portion 53 is brought into surface contact with the whole circumferential surface of the main line 21 for electrical connection. Accordingly, protrusion of the connecting portion between the main line 21 and the connection terminal 50 along the arranging direction can be suppressed to an extend corresponding to the thickness of the wound portion 53. As a result, the distance between the main lines 21 can be made as small as possible, so as to save the space in the branching portion.

Besides, the wound portion 53 wound around the main line 21 is brought into surface contact with the outer circumferential surface of the main line 21, and hence, a large contact area can be attained, resulting in attaining high connection reliability.

Accordingly, when the wire harness 10 including this branching structure of the present embodiment is used, the space of the portion of the main line harness 11 connected to the branch harness 12 can be saved, and high connection reliability can be attained.

Now, a modification of the branching structure of the first embodiment will be described. It is noted that like reference signs are used to refer to like elements used in the first embodiment to omit the description.

(Modification 1-1)

Figure 5:
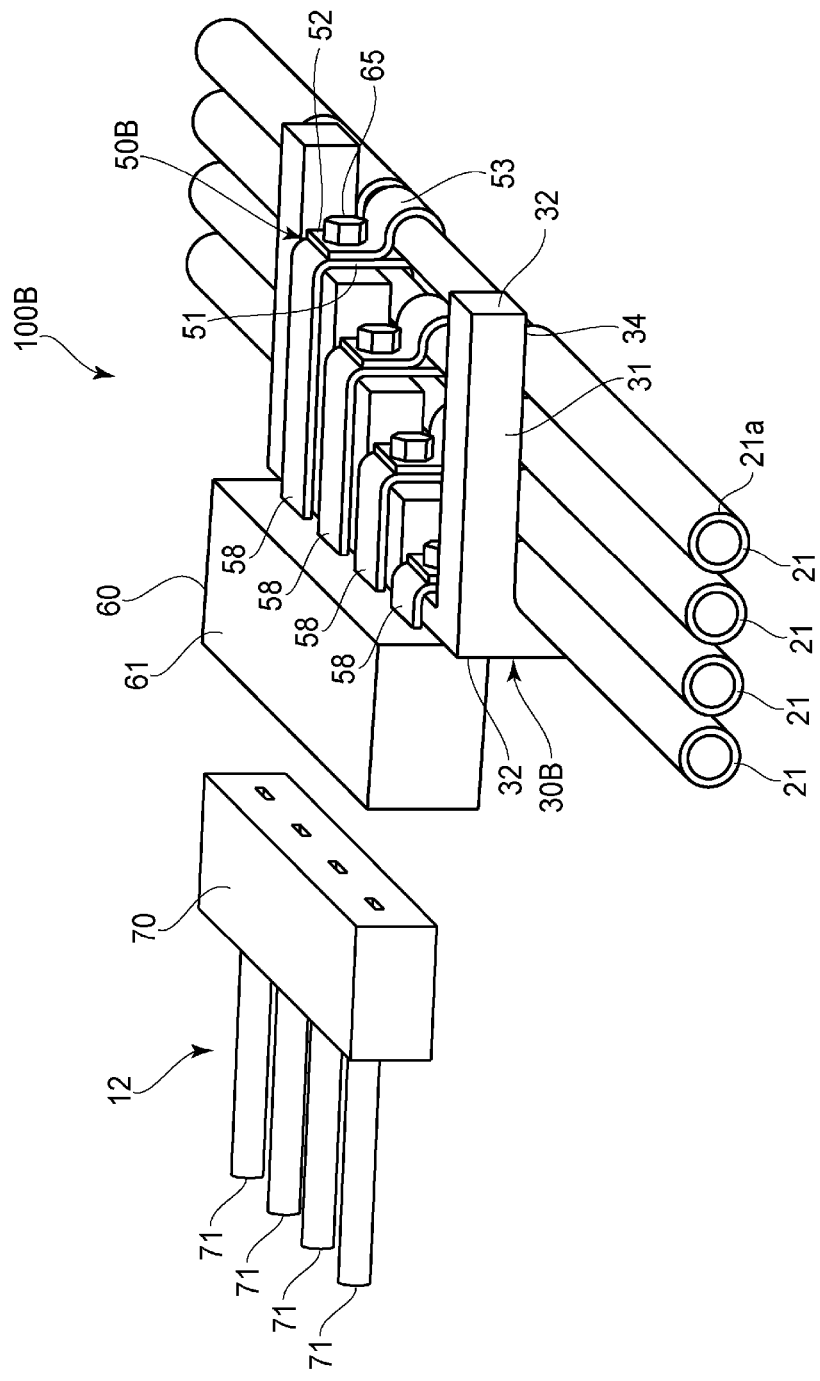
FIG. 5 is a perspective view of a branch box illustrating Modification 1-1.
Figure 6:
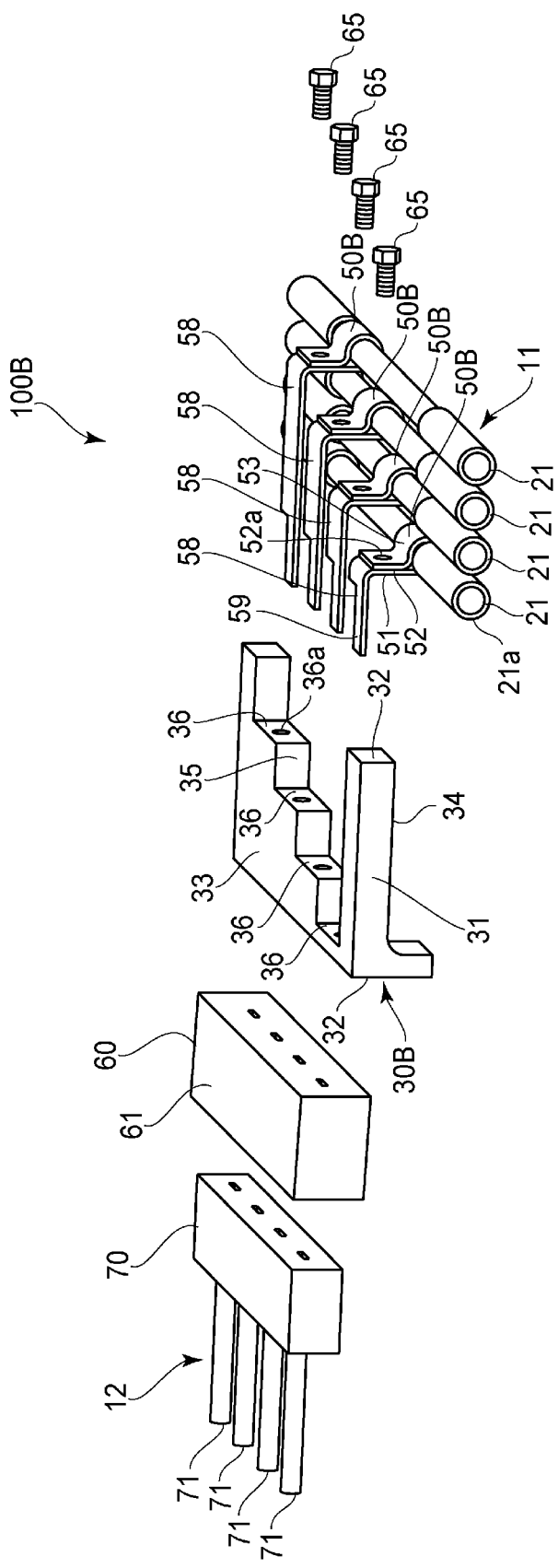
FIG. 6 is an exploded perspective view of the branch box illustrating Modification 1-1.

FIG. 5 is a perspective view of a branch box illustrating Modification 1-1. FIG. 6 is an exploded perspective view of the branch box of Modification 1-1.

As illustrated in FIGS. 5 and 6, the main line harness 11 and the branch harness 12 are connected to each other using a branch box 100B in a branching structure of Modification 1-1.

The branch box 100B includes a case 30B and connection terminals 50B. In each of the connection terminals 50B, a bus bar 58 is integrally provided at an edge of the fixed end 51. The bus bar 58 extends along the arranging direction of the main lines 21. The bus bar 58 has, at an end thereof, a connection pin 59, and the connection pin 59 protrudes beyond the second side surface 32 of the case 30B. The respective bus bars 58 are formed to have different lengths so that the lengths of the connection pins 59 protruding beyond the side surface 32 can be equivalent. The connection pins 59 of these bus bars 58 are inserted into the housing 61 of the connector 60.

The case 30B does not have the main line inserting recesses 31a on the lower surface 34 thereof, but has the first side surface 32 notched. The case 30B is assembled with the first side surface 32 facing to the main lines 21 on which the connection terminals 50B are put. Then, the bus bars 58 of the connection terminals 50B are disposed on the upper surface side of the case 30B, and the main lines 21 are disposed on the lower surface side. In each of the connection terminals 50, the fixed end 51 and a fastening end 52 are disposed on a corresponding one of the base surfaces 36 of the terminal block 35. In this state, the fastening screw 65 is inserted into the insertion holes 52a and 51a of the fastening end 52 and the fixed end 51 and is screwed into the screw hole 36a provided in the corresponding base surface 36 of the terminal block 35. Thus, the fixed end 51 and the fastening end 52 are fastened by the fastening screw 65, the fixed end 51 and the fastening end 52 of the connection terminal 50B come closer to each other to reduce a gap therebetween, and thus, the wound portion 53 is tightened. In this manner, the wound portion 53 is brought into surface contact with the whole circumferential surface of the main line 21, and as a result, the connection terminal 50B and the main line 21 are definitely electrically connected to each other.

In Modification 1-1, when the branch side connector 70 of the branch harness 12 is connected to the connector 60 of the branch box 10B, the branch lines 71 disposed in the branch harness 12 are respectively electrically connected to the main lines 21 of the main line harness 11 via the connection terminals 50B.

Also in Modification 1-1, the protrusion of the connecting portion between the main line 21 and the connection terminal 50B along the arranging direction can be suppressed to an extend corresponding to the thickness of the wound portion 53. As a result, the distance between the main lines 21 can be made as small as possible, so as to save the space in the connecting portion, and in addition, a large contact area can be attained to improve the connection reliability.

In particular, since the connection terminal 50B formed integrally with the bus bar 58 is used, the number of components can be reduced to reduce cost in Modification 1-1.

Second Embodiment

Next, a second embodiment of the present invention will be described. It is noted that like reference signs are used to refer to like elements used in the first embodiment described above to omit the description.

Figure 7:
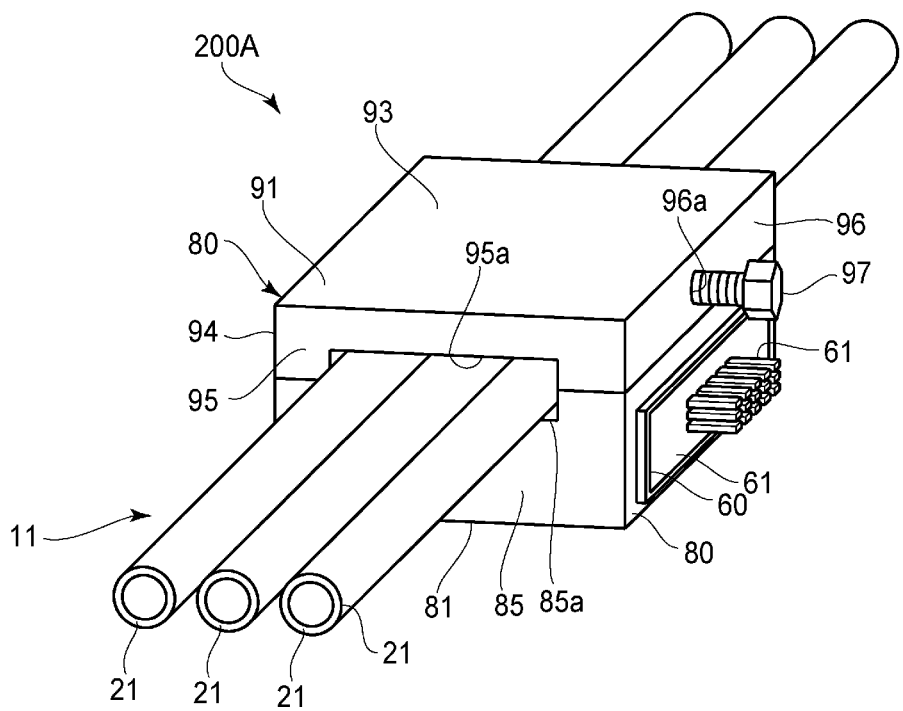
FIG. 7 is a perspective view of a branch box used in a branching structure according to a second embodiment of the present invention.
Figure 8:
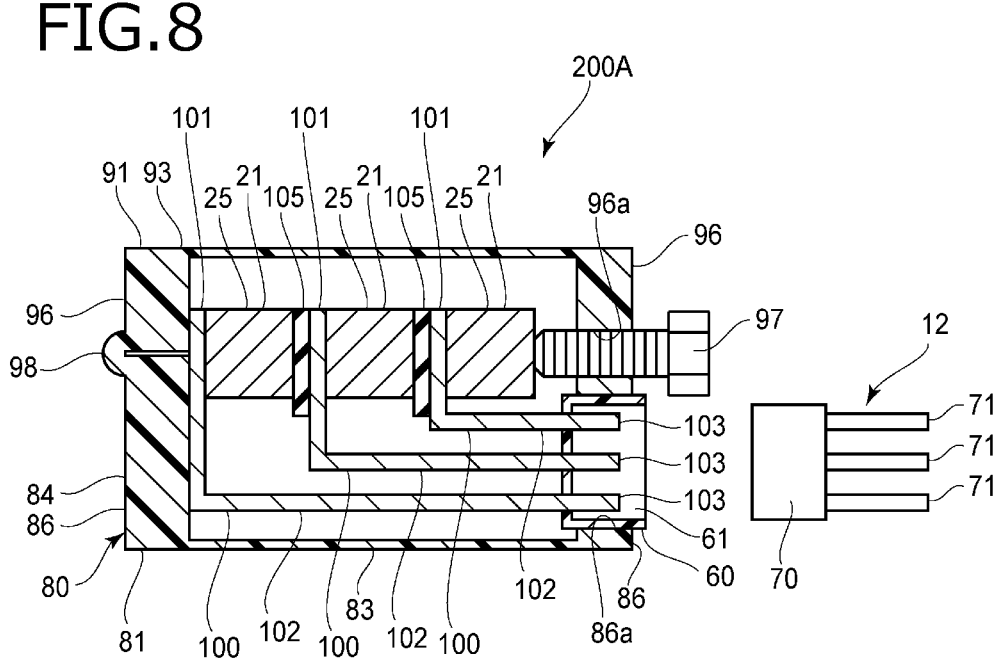
FIG. 8 is a cross-sectional view, taken along a routing direction of a main line, of the branch box used in the branching structure of the second embodiment.
Figure 9:
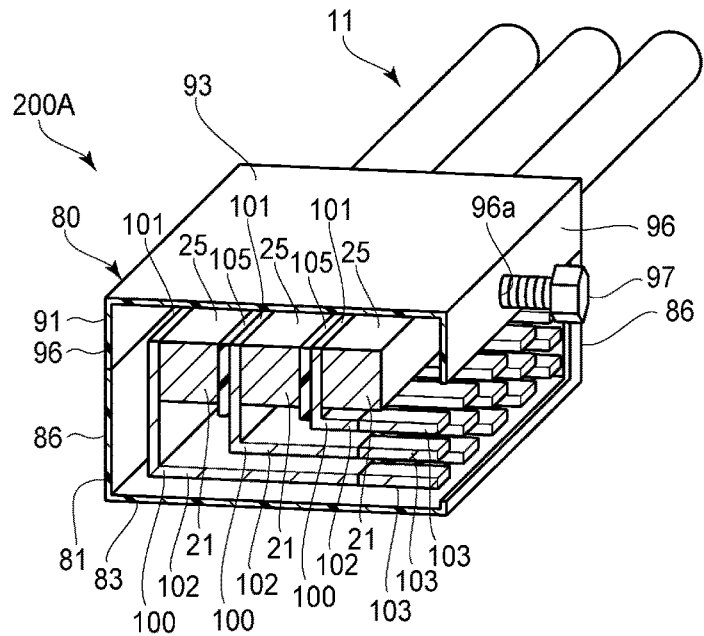
FIG. 9 is a partially cross-sectional perspective view of the branch box used in the branching structure of the second embodiment.
Figure 10:
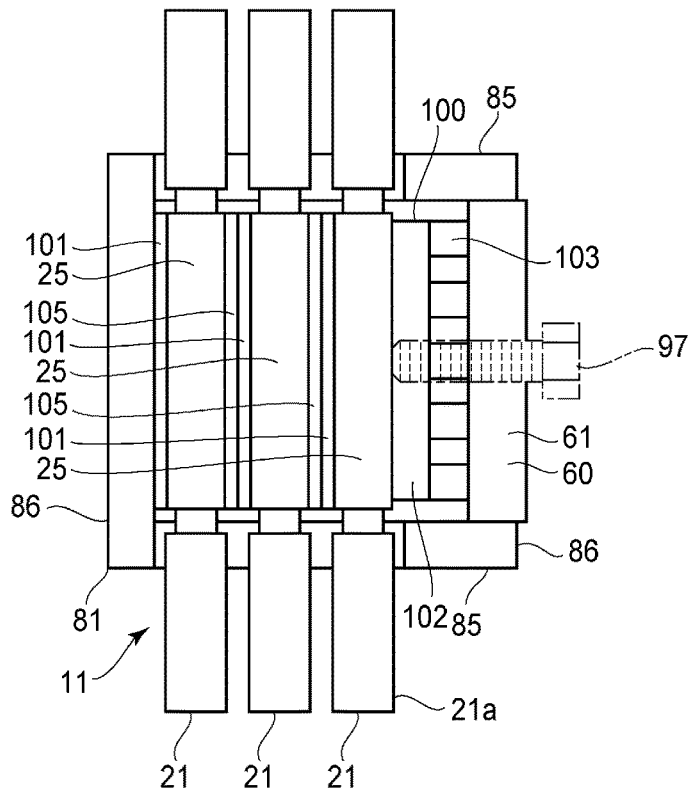
FIG. 10 is a plan view of the branch box used in the branching structure of the second embodiment with a cover removed.
Figure 11:
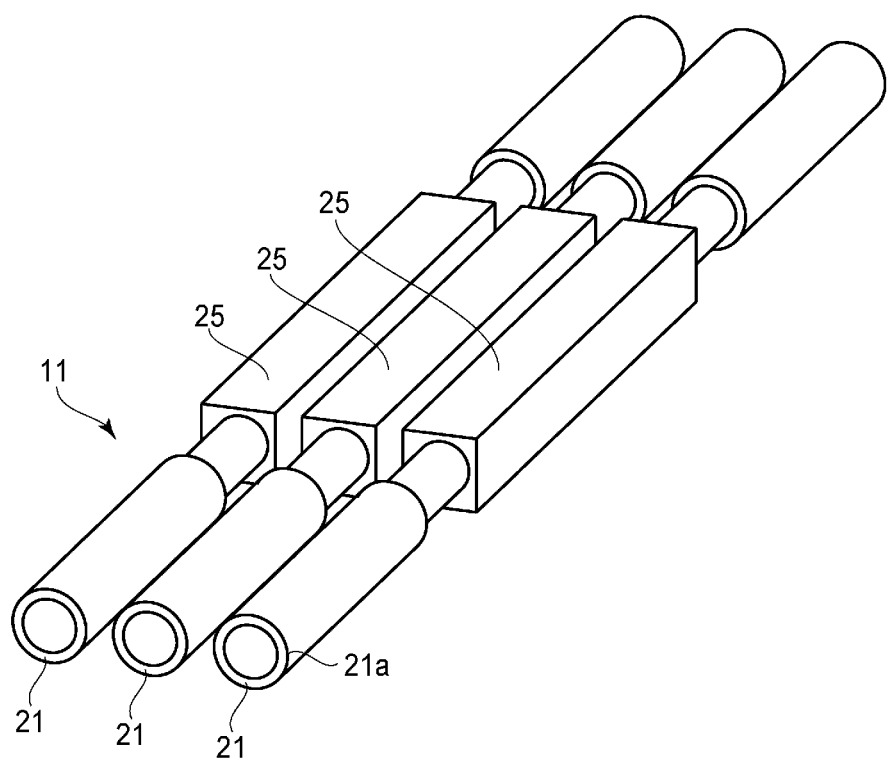
FIG. 11 is a perspective view of a main line harness to be connected through the branching structure of the second embodiment.

FIG. 7 is a perspective view of a branch box used in a branching structure of the second embodiment. FIG. 8 is a cross-sectional view, taken along a routing direction of main lines, of the branch box used in the branching structure of the second embodiment. FIG. 9 is a partially cross-sectional perspective view of the branch box used in the branching structure of the second embodiment. FIG. 10 is a plan view of the branch box used in the branching structure of the second embodiment with a cover thereof removed. FIG. 11 is a perspective view of a main line harness connected using the branching structure of the second embodiment.

As illustrated in FIGS. 7 to 10, the main line harness 11 and the branch harness 12 are connected to each other using a branch box 200A in the second embodiment.

The branch box 200A includes a housing case 80. The housing case 80 is composed of a lower case 81 and a cover 91. The lower case 81 and the cover 91 are made of a resin having an insulating property.

The lower case 81 has a rectangular bottom plate 83 and peripheral walls 84 formed at the edges of the bottom plate 83. The peripheral walls 84 include end plates 85 and side plates 86 respectively opposing each other. The end plates 85 have main line inserting recesses 85a formed in opposing positions. A first one of the side plates 86 has a connector holding recess 86a. In the connector holding recess 86a, the housing 61 of the connector 60 to be connected to the branch side connector 70 is held.

The cover 91 has a rectangular upper plate 93 and peripheral walls 94 formed at the edges of the upper plate 93. The peripheral walls 94 include end plates 95 and side plates 96 respectively opposing each other. The end plates 95 have main line inserting recesses 95a in opposing positions. Besides, a screw hole 96a is formed in a first one of the side plates 96. The screw hole 96a is formed by insert molding the side plate 96 of the cover 91 with a nut. A pressing screw (pressing means) 97 is screwed into the screw hole 96a. It is noted that the screw hole 96a may be directly formed in the side plate 96 of the cover 91.

The lower case 81 and the cover 91 of the housing case 80 are rotatably connected to each other at second ones of the side plates 86 and 96 with a hinge 98. Thus, the lower case 81 is closed/opened by rotating the cover 91 against the lower case 81.

In the housing case 80, the three main lines 12 disposed in the main line harness 11 are inserted, so as to house, therein, the portions thereof from which the coatings 21a have been removed. These main lines 21 are caused to run respectively through openings formed by the main line inserting recesses 85a and 95a respectively formed in the end plates 85 and 95 of the lower case 81 and the cover 91.

As illustrated in FIG. 11, the portion of each of the main lines 21 housed in the housing case 80 corresponds to a connecting part 25 formed to have a rectangular cross-section by pressing. These main lines 21 are arranged at the same level as the pressing screw 97 in the housing case 80.

The branch box 200A includes connection terminals 100 in the same number as that of the main lines 21. Each of the connection terminals 100 includes a connection plate 101 and a bus bar 102. The connection plate 101 is formed in a plate shape, and the bus bar 102 extends from the lower end of the connection plate 101 toward the connector 60 held in the connector holding recess 86a of the lower case 81 along the arranging direction of the main lines 21. The end of each bus bar 102 corresponds to a connection pin 103, which is guided into the housing 61 of the connector 60. The connection pins 103 of these bus bars 102 are formed in a comb shape.

The connection plate 101 of each connection terminal 100 is disposed on a side of the connecting part 25 of the main line 21 opposite to the pressing screw 97. Besides, the connection plates 101 excluding one disposed farthest from the pressing screw 97 are respectively provided with plate-shaped insulating members 105 on the side opposite to the pressing screw 97. It is noted that the connection plate 101 disposed farthest from the pressing screw 97 is in contact with an inner surface of the housing case 80.

The connection plates 101 of the connection terminals 100 are different from one another in the length protruding downward. Specifically, the length becomes larger in a direction away from the side of the connector 60. Besides, the bus bars 102 of the connection terminals 100 are different from one another in their length so that their connection pins 103 can be inserted into the housing 61 of the connector 60. Specifically, the length becomes larger in the direction away from the side of the connector 60. Thus, within the housing 61 of the connector 60, the connection pins 103 in the comb shape of the bus bars 102 are vertically arranged.

In this branch box 200A, for connecting the branch lines 71 of the branch harness 12 to the main lines 21 of the main line harness 11, the connecting parts 25 of the main lines 21 are housed in the lower case 81 opened upward.

In this state, the cover 91 is rotated to close the upper portion of the lower case 81, and the cover 91 is fixed on the lower case 81 with a locking mechanism not illustrated.

Thereafter, the pressing screw 97 of the cover 91 is screwed up. In this manner, the main line 21 disposed on the side of the pressing screw 97 is pressed in the screwing direction by the pressing screw 97 thus screwed, and the main line 21 is sandwiched between the pressing screw 97 and the inner surface of the housing case 80. In this manner, the connecting parts 25 of the respective main lines 21 are pressed against and brought into surface contact with the corresponding connection plates 101 of the connection terminals 100. As a result, the main line 21 is electrically connected to the corresponding connection terminal 100. At this point, since the insulating member 105 is disposed on the side of the connection plate 101 opposite to the screw 97, the main lines 21 are never electrically connected to each other via the connection plate 101.

In the second embodiment, when the branch side connector 70 of the branch harness 12 is connected to the connector 60 of the branch box 200A, the branch lines 71 disposed in the branch harness 12 are electrically connected to the main lines 21 of the main line harness 11 via the connection terminals 100.

According to the branching structure of the second embodiment, when the plural main lines 21 are pressed by the pressing means of the pressing screw 97 in the arranging direction, the main lines 21 are pressed against the connection plates 101 to be mutually electrically connected. Accordingly, the protrusion of the connecting portion between the main line 21 and the connection terminal 100 along the arranging direction can be suppressed to an extend corresponding to the thickness of the connection plate 101. As a result, the distance between the main lines 21 can be made as small as possible, so as to save the space in the branching portion.

Besides, when the main line 21 is pressed against the connection plate 101, the main line 21 is brought into surface contact with the connection terminal 100 to obtain a good conducting state, and hence high connection reliability can be attained.

Accordingly, when the wire harness 10 including this branching structure of the present embodiment is used, the space in the connecting portion, to the branch harness 12, of the main line harness 11 can be saved, and high connection reliability can be attained.

Incidentally, although the portion of the main line 21 housed in the housing case 80 is formed to have a rectangular cross-section to be brought into surface contact with the plate-shaped connection plate 101 in the above-described embodiment, the main line 21 may be in the shape of a round bar. In this case, the connection plate 101 is preferably formed to have a curved cross-section so as to be brought into surface contact with the outer circumferential surface of the main line 21 in the shape of a round bar.

Now, modifications of the branching structure of the second embodiment will be described. It is noted that like reference signs are used to refer to like elements used in the first or second embodiment to omit the description.

(Modification 2-1)

Figure 12:
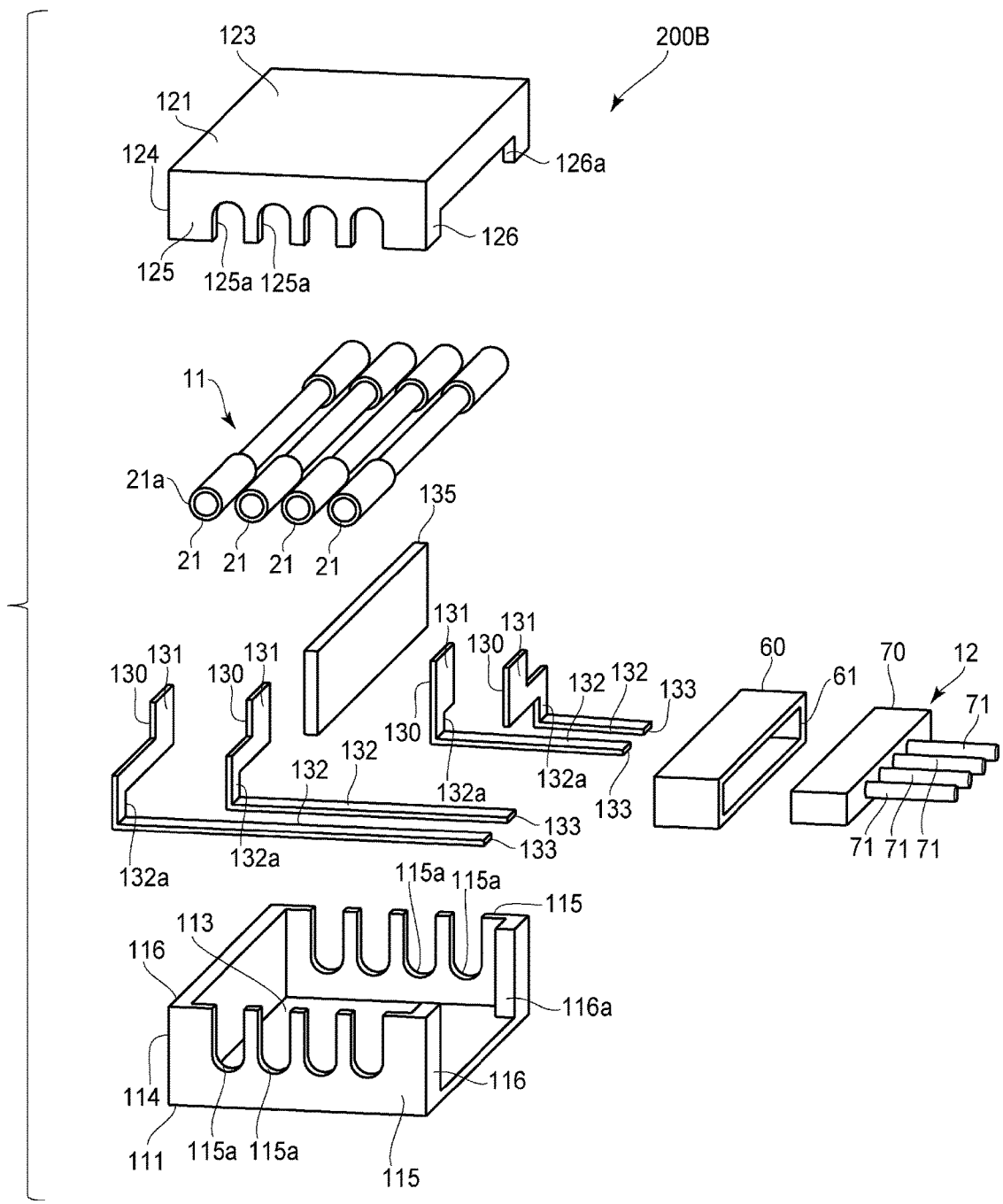
FIG. 12 is an exploded perspective view of a branch box illustrating Modification 2-1.
Figure 13A:
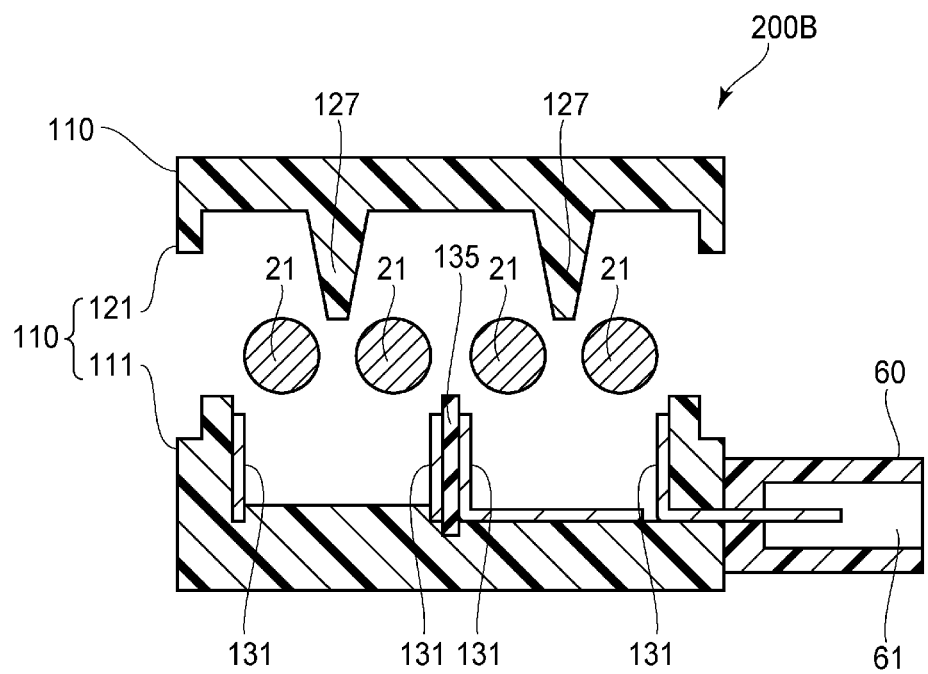
FIGS. 13A and 13B are diagrams of a connecting portion of the branch box used in Modification 2-1, and specifically.
Figure 13B:
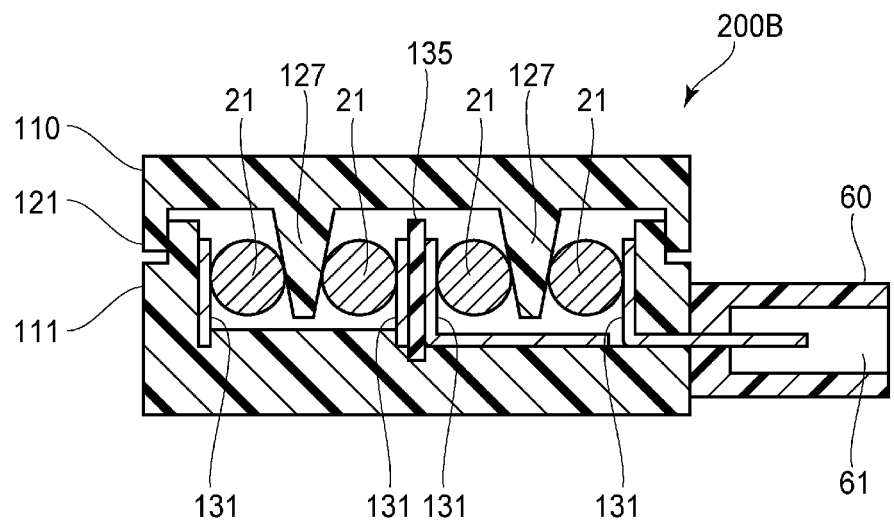

FIG. 12 is an exploded perspective view of a branch box illustrating Modification 2-1. FIGS. 13A and 13B are diagrams illustrating a connecting portion of the branch box used in Modification 2-1, and specifically, FIG. 13A is a cross-sectional view thereof taken along the arranging direction of the main lines before connection, and FIG. 13B is a cross-sectional view thereof taken along the arranging direction of the main lines after the connection.

As illustrated in FIGS. 12, 13A and 13B, in the branching structure of Modification 2-1, the main line harness 11 and the branch harness 12 are connected to each other using a branch box 200B.

The branch box 200B includes a housing case 110. The housing case 110 is composed of a lower case 111 and a cover 121. The lower case 111 and the cover 121 are made of a resin having an insulating property.

The lower case 111 has a rectangular bottom plate 113 and peripheral walls 114 formed at the edges of the bottom plate 113. The peripheral walls 114 include end plates 115 and side plates 116 respectively opposing each other. The end plates 115 have main line inserting recesses 115a, formed in opposing positions, in the same number as that of the main lines 21. A first one of the side plates 116 has a connector holding recess 116a. In the connector holding recess 116a, a lower portion of the housing 61 of the connector 60 to be connected to the branch side connector 70 is held.

In the lower case 111, the portions of the four main lines 21 disposed in the main line harness 11 from which the coatings 21a have been removed are housed to be respectively fit in the main line inserting recesses 115a formed in the end plates 115 of the lower case 111.

The cover 121 has a rectangular upper plate 123 and peripheral walls 124 formed at the edges of the upper plate 123. The peripheral walls 124 include end plates 125 and side plates 126 respectively opposing each other. The end plates 125 have main line inserting recesses 125a, formed in opposing positions, in the same number as that of the main lines 21. Besides, in a first one of the side plates 126, a connector housing recess 126a is formed. In the connector housing recess 126a, an upper portion of the housing 61 of the connector 60 to be connected to the branch side connector 70 is held.

In the cover 121, two pressing ridges (pressing means) 127 projecting downward are formed on the upper plate 123. These pressing ridges 127 are formed to extend along the lengthwise direction of the main line harness 11. The pressing ridges 127 are formed to have a wedge-shaped cross-section tapered in a direction to be put on the lower case 111. The pressing ridges 127 are disposed to be spaced from each other in the arranging direction of the main lines 21, and are disposed between the central two main lines 21 and the outside two main lines 21 out of the four main lines 21 disposed in the main line harness 11.

The branch box 200B includes connection terminals 130 in the same number as that of the main lines 21. Each of the connection terminals 130 includes a connection plate 131 and a bus bar 132. The connection plate 131 is formed in a plate shape, and the bus bar 132 extends from the lower end of the connection plate 131 toward the connector 60 along the arranging direction of the main lines 21. The end of each bus bar 132 corresponds to a connection pin 133, which is guided into the housing 61 of the connector 60. The bus bars 132 of the connection terminals 130 are formed to have different lengths so that the connection pins 133 can align. The connection plates 131 of the connection terminals 130 are aligned along the arranging direction of the main lines 21. Each of the bus bars 132 has a link portion 132a extending in the lengthwise direction of the main line harness 11 and linked to the connection plate 131. The link portions 132a of the respective connection terminals 130 are different in the length and the extending direction so that the bus bars 132 of the respective connection terminals 130 can be arranged at intervals along the lengthwise direction of the main line harness 11.

In the lower case 111, the connection plates 131 of the connection terminals 130 are disposed outside the outside main lines 21 of the main line harness 11, and furthermore, the connection plates 131 of the two connection terminals 130 are disposed between the central two main lines 21. A plate-shaped insulating member 135 is sandwiched between the two connection plates 131 disposed in the center, so as to insulate these connection plates 131 from each other.

In this branch box 200B, for connecting the branch lines 71 of the branch harness 12 respectively to the main lines 21 of the main line harness 11, the portions of the main lines 21 from which the coatings 21a have been removed are housed in the lower case 111 opened upward.

In this state, the cover 121 is placed to close the upper portion of the lower case 111, and the cover 121 is pressed against the lower case 111 to fix the cover 121 on the lower case 111 with a locking mechanism not illustrated.

In this manner, the wedge-shaped pressing ridges 127 provided on the cover 121 enter between the central two main lines 21 and the outside two main lines 21 out of the four main lines 21 disposed in the main line harness 11 (see FIG. 13B). Thus, the outside main lines 21 disposed outside the two central main lines 21 are pressed by the pressing ridges 127 in directions away from each other. As a result, the two outside main lines 21 out of the four main lines 21 are pressed against and electrically connected to the connection plates 131 of the connection terminals 130 disposed outside, and the two central main lines 21 are pressed against and electrically connected to the connection plates 131 of the connection terminals 130 disposed in the center.

In Modification 2-1, when the branch side connector 70 of the branch harness 12 is connected to the connector 60 of the branch box 200B, the branch lines 71 disposed in the branch harness 12 are respectively electrically connected to the main lines 21 of the main line harness 11 via the connection terminals 130.

In Modification 2-1, when the plural main lines 21 are pressed in the arranging direction by the pressing means of the pressing ridges 127 of the cover 121, the main lines 21 are pressed against and electrically connected to the connection plates 131. Accordingly, the protrusion of the connecting portion between the main line 21 and the connection terminal 130 along the arranging direction can be suppressed to an extend corresponding to the thickness of the connection plate 121. As a result, the distance between the main lines 21 can be made as small as possible, so as to save the space in the branching portion.

(Modification 2-2)

Figure 14:
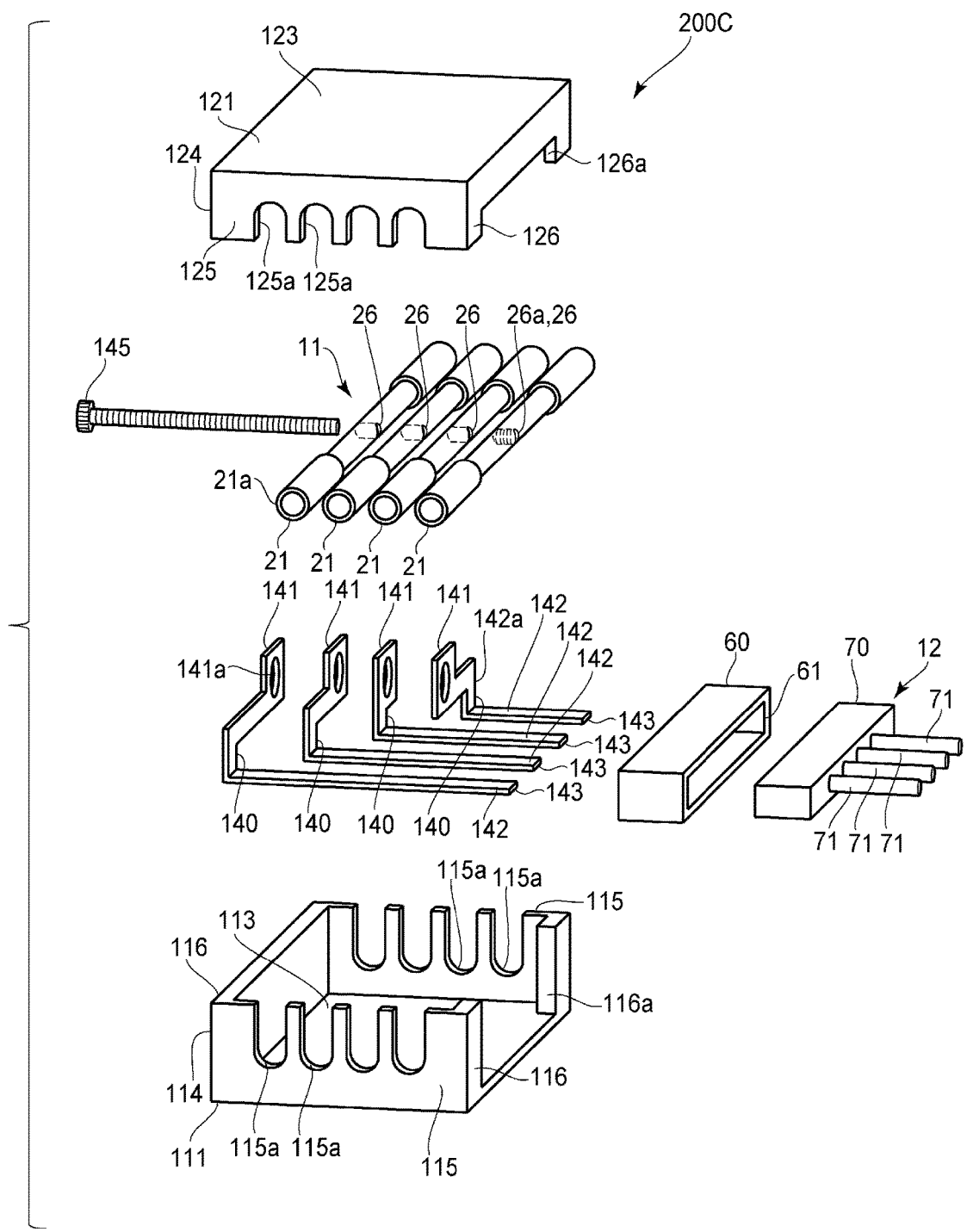
FIG. 14 is an exploded perspective view of a branch box illustrating Modification 2-2.
Figure 15:
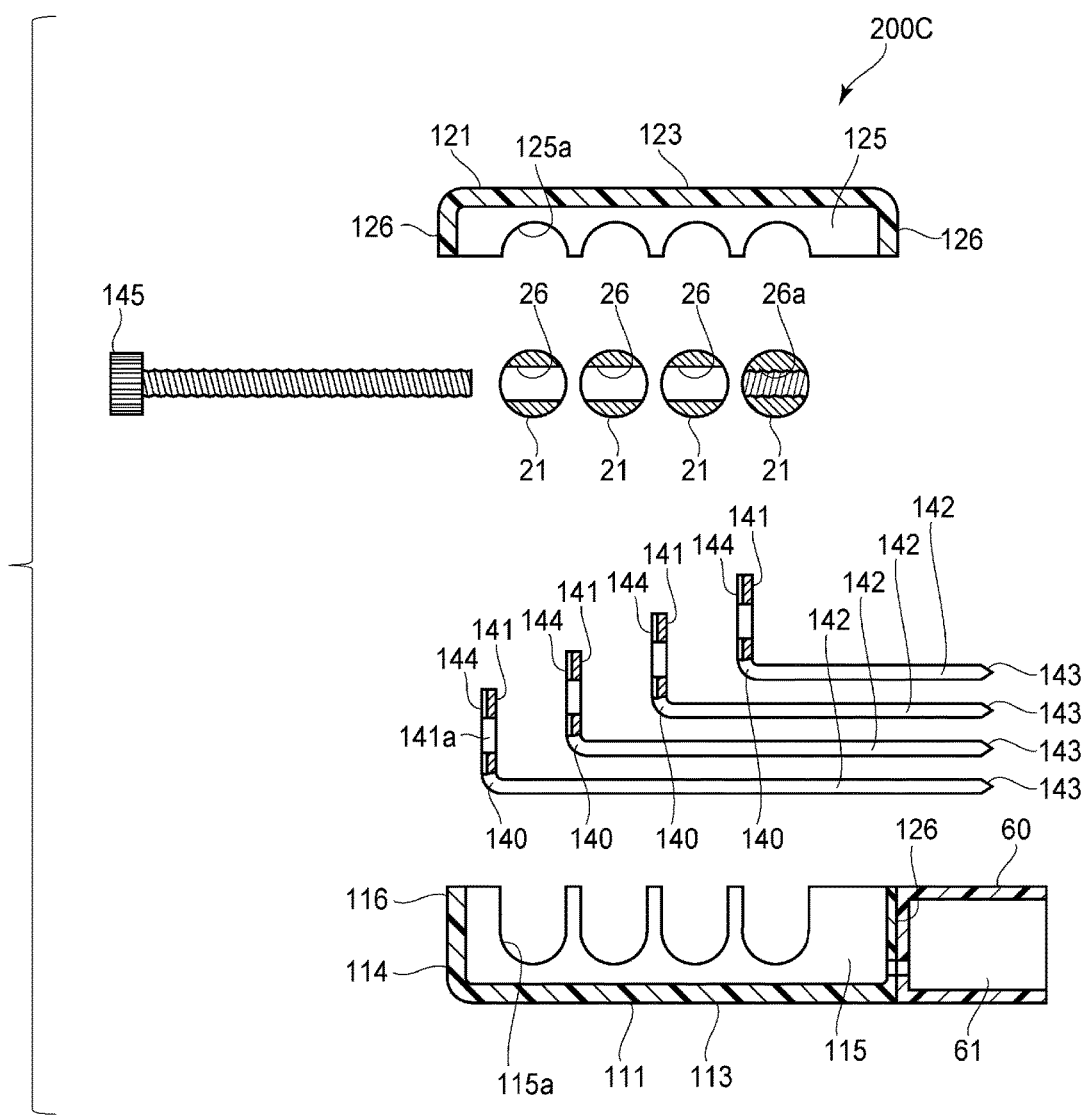
FIG. 15 is a cross-sectional view, taken along the arranging direction of main lines, of the branch box used in Modification 2-2 before connection.
Figure 16:
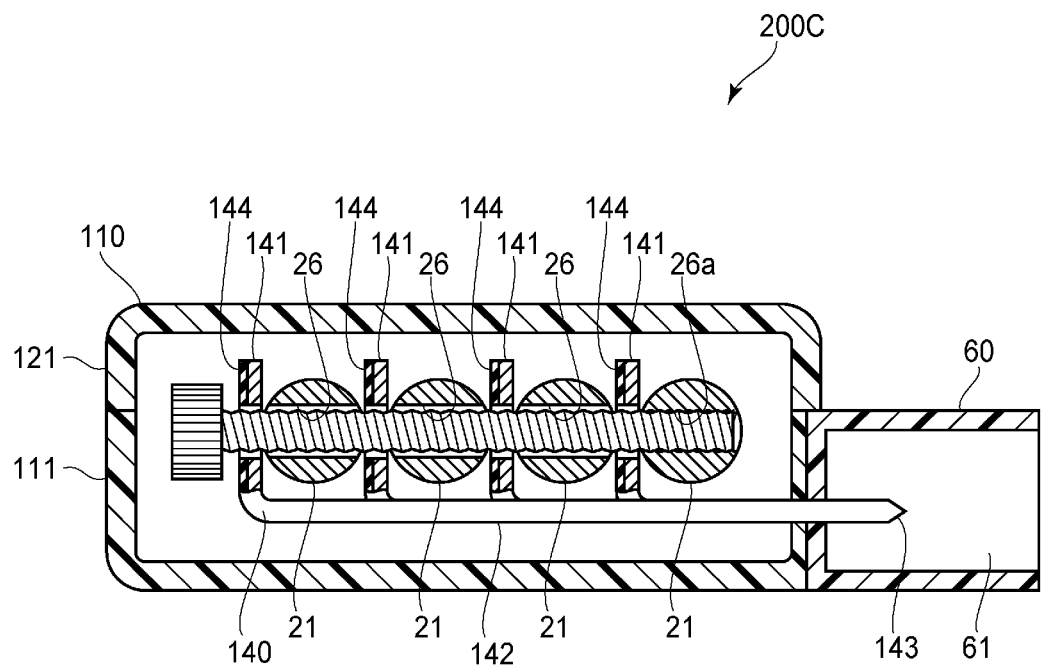
FIG. 16 is a cross-sectional view, taken along the arranging direction of the main lines, of the branch box used in Modification 2-2 after the connection.

FIG. 14 is an exploded perspective view of a branch box illustrating Modification 2-2. FIG. 15 is a cross-sectional view, taken along the arranging direction of the main lines, of the branch box used in Modification 2-2 before connection. FIG. 16 is a cross-sectional view, taken along the arranging direction of the main lines, of the branch box used in Modification 2-2 after the connection.

As illustrated in FIGS. 14 to 16, in a branching structure of Modification 2-2, the main line harness 11 and the branch harness 12 are connected to each other using a branch box 200C.

In the branch box 200C, a housing case 110 including a cover 121 not having the pressing ridges 127 is used.

The portions of the four main lines 21 disposed in the main line harness 11 from which the coatings 21a have been removed are housed in the housing case 110. In the main lines 21, holes 26 communicating with one another in the arranging direction are respectively formed, and the hole 26 of the main line 21 disposed closest to the connector 60 is formed as a female screw hole 26a.

The branch box 200C includes connection terminals 140 in the same number as that of the main lines 21. Each of the connection terminals 140 includes a connection plate 141 and a bus bar 142. The connection plate 141 is formed in a plate shape, and the bus bar 142 extends from the lower end of the connection plate 141 toward the connector 60 along the arranging direction of the main lines 21. The end of each bus bar 142 corresponds to a connection pin 143, which is guided into the housing 61 of the connector 60. The bus bars 142 of the connection terminals 140 are formed to have different lengths so that the connection pins 143 can align. The connection plates 141 of the connection terminals 140 are aligned along the arranging direction of the main lines 21. Each of the bus bars 142 has a link portion 142a extending in the lengthwise direction of the main line harness 11 and linked to the connection plate 141. The link portions 142a of the respective connection terminals 140 are different in the length and the extending direction so that the bus bars 142 of the respective connection terminals 140 can be arranged at intervals along the lengthwise direction of the main line harness 11.

A hole 141a is formed in the connection plate 141 of each connection terminal 140. Besides, the connection plate 141 of each connection terminal 140 is provided with an insulating member 144 on the side opposite to the connector 60. The insulating member 144 is provided, for example, by coating the connection plate 141 with an insulating material.

In the lower case 111, the connection plates 141 of the connection terminals 140 are respectively disposed on the side of the corresponding main lines 21 of the main line harness 11 opposite to the connector 60. These connection plates 141 have the holes 141a communicating with the holes 26 of the main lines 21. In addition, a fastening bolt (pressing means) 145 is inserted, from the side opposite to the connector 60, through the holes 141a of the connection plates 141 and the holes 26 of the main lines 21 communicating with one another, so as to be screwed into the screw hole 26a of the main line 21 closest to the connector 60. It is noted that the holes 26 of the main lines 21 through which the fastening bolt 145 is inserted are provided with an insulating material coated on their inner surfaces, so that the main lines 21 cannot be electrically connected to one another through the fastening bolt 145.

In the branch box 200C, when the fastening bolt 145 is fastened, the main line 21 having the screw hole 26a is drawn closer owing to the fastening force. Thus, the respective main lines 21 are pressed against and electrically connected to the corresponding connection plates 141 of the connection terminals 140. Incidentally, the connection plate 141 of each connection terminal 140 is insulated, by the insulating member 144, from the main line 21 disposed closer to the head of the fastening bolt 145 or from the head of the fastening bolt 145.

In Modification 2-2, when the branch side connector 70 of the branch harness 12 is connected to the connector 60 of the branch box 200C, the branch lines 71 disposed in the branch harness 12 are electrically connected to the main lines 21 disposed in the main line harness 11 via the connection terminals 140.

In Modification 2-2, the plural main lines 21 are pressed in the arranging direction by the pressing means of the fastening bolt 145 screwed into the main line 21 having the screw hole 26a, and hence, the main lines are pressed against and brought into contact with the connection plates 141 to be mutually electrically connected. Accordingly, the protrusion of the connecting portion between the main line 21 and the connection terminal 140 along the arranging direction can be suppressed to an extend corresponding to the thickness of the connection plate 141. As a result, the distance between the main lines 21 can be made as small as possible, so as to save the space in the branching portion.

It is noted that a resin bolt is preferably used as the fastening bolt 145. If the fastening bolt 145 is made of a resin, there is no need to provide the insulating member 144 of the connection plate 141 in contact with the head of the fastening bolt 145 and the insulating material coated on the inner surfaces of the holes 26 of the main lines 21 through which the fastening bolt 145 is inserted.

Next, various connection examples for connecting the branch lines 71 of the branch harness 12 respectively to the main lines 21 of the main line harness 11 will be described. It is noted that like reference signs are used to refer to like elements used in the first and second embodiments described above to omit the description.

Connection Example 1

Figure 17:
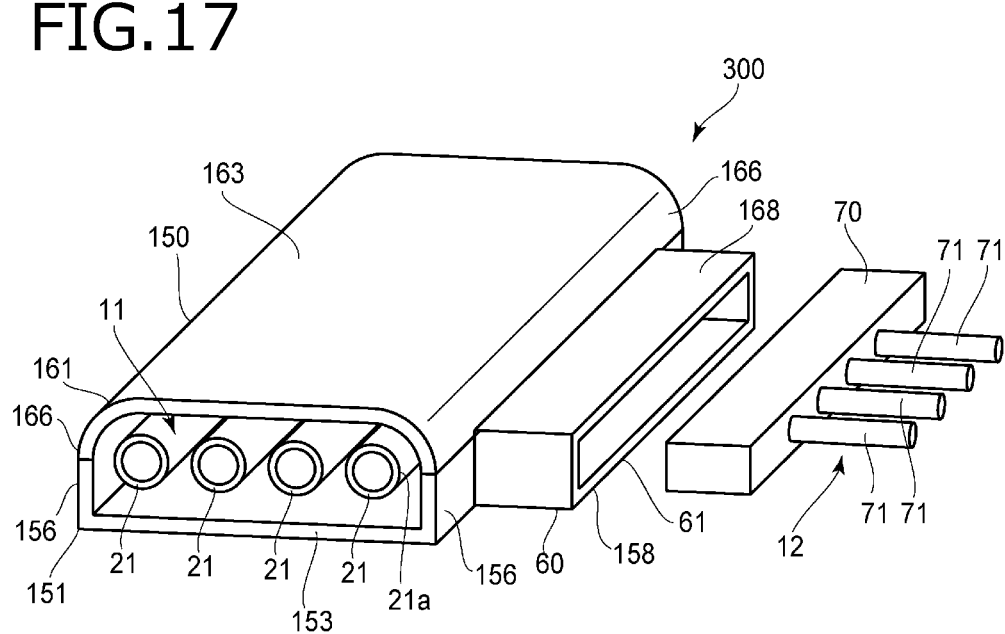
FIG. 17 is a perspective view of a branch box illustrating Connection Example 1.
Figure 18:
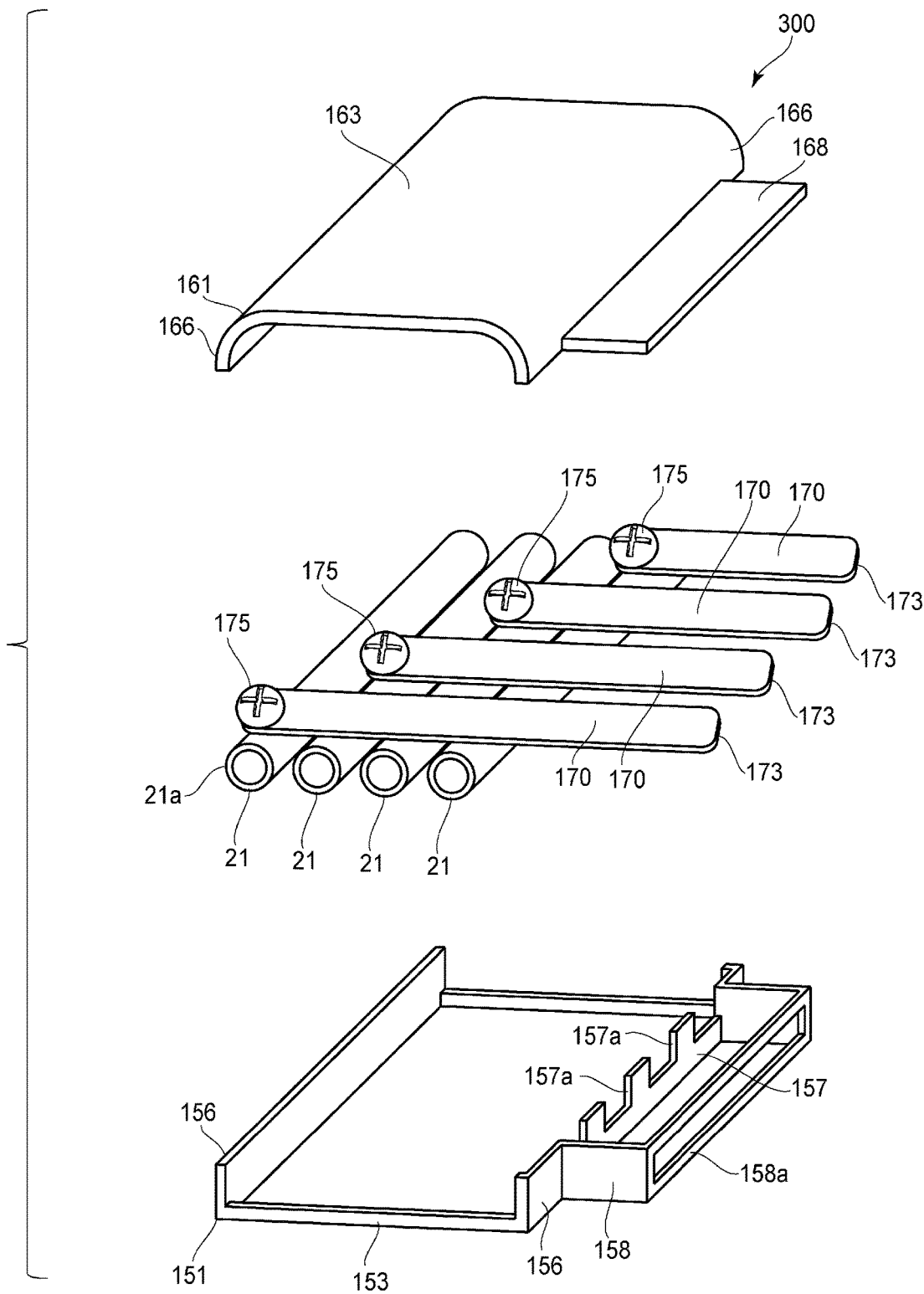
FIG. 18 is an exploded perspective view of the branch box illustrating Connection Example 1.
Figure 19A:
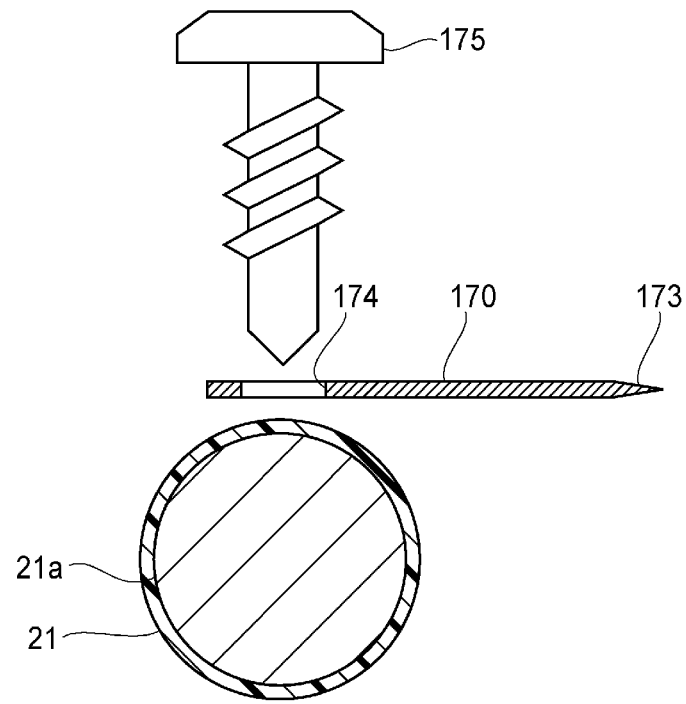
FIGS. 19A and 19B are diagrams illustrating a connection structure between a main line and a connection terminal in Connection Example 1, and specifically.
Figure 19B:
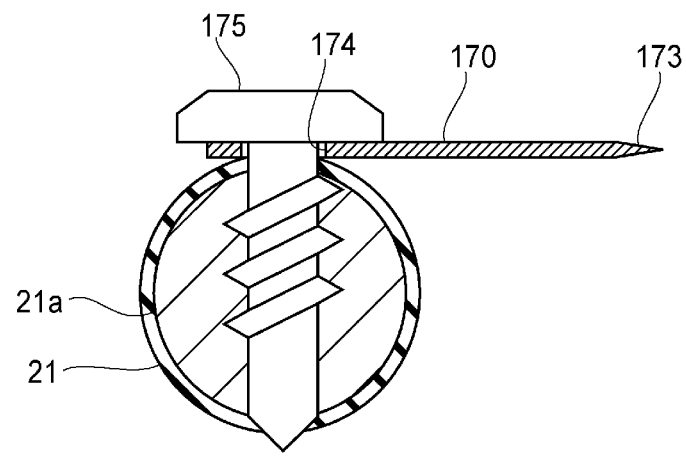

FIG. 17 is a perspective view of a branch box illustrating Connection Example 1. FIG. 18 is an exploded perspective view of the branch box illustrating Connection Example 1. FIGS. 19A and 19B are diagrams illustrating a connection structure between a main line and a connection terminal employed in Connection Example 1, and specifically, FIG. 19A is a cross-sectional view thereof before connection and FIG. 19B is a cross-sectional view thereof after the connection.

As illustrated in FIGS. 17 and 18, the main line harness 11 and the branch harness 12 are connected to each other using a branch box 300 in Connection Example 1.

The branch box 300 includes a housing case 150 consisting of a lower case 151 and a cover 161 made of a resin having an insulating property.

The lower case 151 has a bottom plate 153 and side plates 156. In a first one of the side plates 156, an alignment plate 157 having a plurality of recesses 157a and a housing portion 158 having an opening 158a are formed.

The cover 161 has an upper plate 163 and side plates 166. In a first one of the side plates 166, a housing plate 168 is formed. The cover 161 is put to close the lower case 151. When the cover 161 is put on the lower case 151, the housing plate 168 of the cover 161 is disposed over an opened upper portion of the housing portion 158 of the lower case 151, and thus, the housing 61 of the connector 60 is formed on one side of the housing case 150.

In the lower case 151, the four main lines 21 disposed in the main line harness 11 are housed. On these main lines 21, connection terminals 170 are respectively fixed.

As illustrated in FIG. 19A, each connection terminal 170 is made of a conductive metal material and is formed in the shape of a long and narrow plate. The connection terminal 170 has a hole 174 at its base, and has a connection pin 173 at its tip. A fixing screw 175 is inserted through the hole 174 at the base. As the fixing screw 175, for example, a tapping screw having a pointed tip is used.

As illustrated in FIG. 19B, the fixing screw 175 inserted through the hole 174 of the connection terminal 170 is directly screwed into the main line 21 having the cover 21a thereon. Thus, the base of the connection terminal 170 is fixed on the main line 21 with the fixing screw 175, and as a result, the main line 21 is electrically connected to the connection terminal 170 via the fixing screw 175.

The connection terminals 170 thus fixed on the main lines 21 are respectively caught and held in the recesses 157a of the alignment plate 157 of the lower case 151. Thus, the connection terminals 170 are housed in the housing 61 of the connector 60 formed by the housing portion 158 and the housing plate 168 with the connection pins 173 corresponding to their tips aligned in the lengthwise direction of the main line harness 11.

In Connection Example 1, when the branch side connector 70 of the branch harness 12 is connected to the connector 60 of the branch box 300, the branch lines 71 disposed in the branch harness 12 are respectively electrically connected to the main lines 21 of the main line harness 11 via the connection terminals 170 and the fixing screws 175.

In Connection Example 1, since the fixing screw 175 is directly screwed into the main line 21 having the cover 21a thereon to electrically connecting the connection terminal 170 to the main line 21, and hence, a branching operation for the branch harness 12 can be easily performed, and in addition, the branch harness 12 can be connected in an arbitrary position.

Connection Example 2

Figure 20:
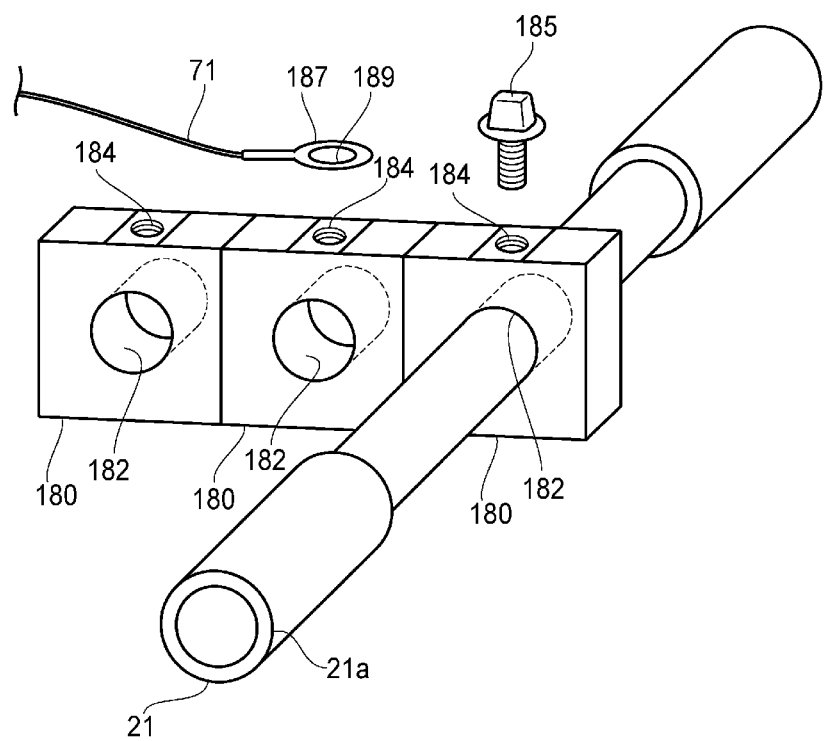
FIG. 20 is a perspective view of a connecting portion illustrating Connection Example 2.
Figure 21:
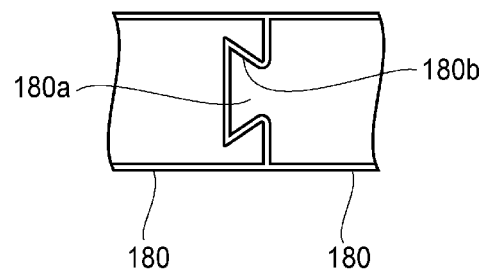
FIG. 21 is a schematic plan view of a connecting portion between branch blocks.

FIG. 20 is a perspective view of a connecting portion illustrating Connection Example 2. FIG. 21 is a schematic plan view of a portion for linking branch blocks.

As illustrated in FIG. 20, a plurality of branch blocks 180 are used in Connection Example 2. Each branch block 180 is made of a resin having an insulating property. Each branch block 180 has an insertion hole 182, through which the main line 21 of the main line harness 11 is inserted to have, therein, the portion of the main line 21 from which the cover 21a has been removed. In an upper portion of the branch block 180, a screw hole 184 communicating with the through hole 182 is formed, and a screw 185 is screwed into the screw hole 184.

A connection terminal 187 made of a conductive metal material is connected to the branch line 71 of the branch harness 12 to be connected to the main line 21. The connection terminal 187 has a hole 189, and the screw 185 to be screwed into the hole 184 of the branch block 180 is inserted through the hole 189.

In the branch block 180, when the screw 185 inserted through the hole 189 of the connection terminal 187 is screwed into the screw hole 184, the screw 185 comes into contact with the main line 21 inserted through the insertion hole 182. Thus, the branch line 71 is electrically connected to the main line 21 via the connection terminal 187 and the screw 185.

As illustrated in FIG. 21, each branch block 180 has a tenon 180a on one side surface thereof, and a mortise 180b on the other side surface. Therefore, the plural branch blocks 180 can be linked to one another in the arranging direction of the main lines 21 by engaging the tenon 180a with the mortise 180b.

When this branch block 180 is used, the branch block 180 can be attached to necessary one(s) of the plural main lines 21 of the main line harness 11 for connecting the branch line 71 of the branch harness 12 thereto.

Connection Example 3

Figure 22:
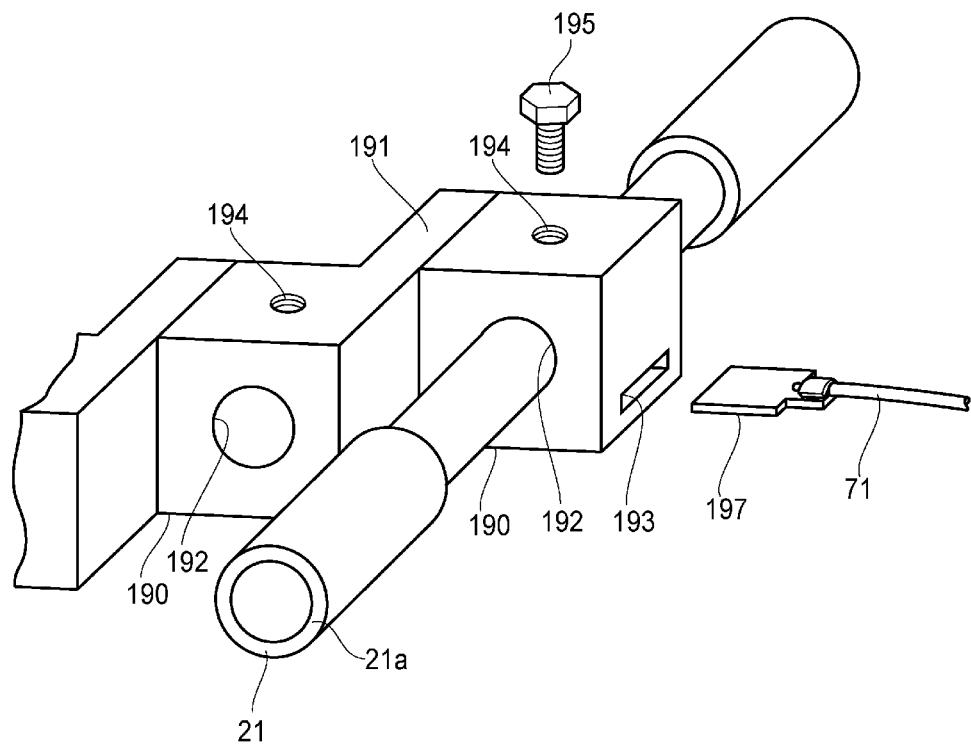
FIG. 22 is a perspective view of a connecting portion illustrating Connection Example 3.
Figure 23:
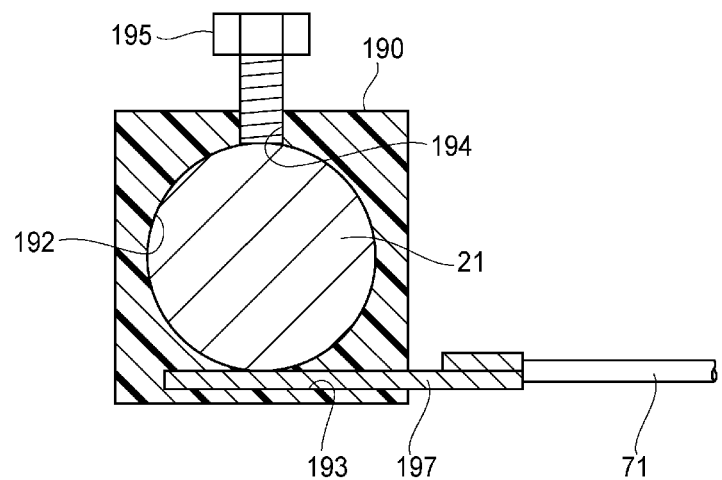
FIG. 23 is a cross-sectional view of a connecting portion between a branch block and a main line.

FIG. 22 is a perspective view of a connecting portion illustrating Connection Example 3. FIG. 23 is a cross-sectional view of a connecting portion of a branch block to be connected to a main line.

As illustrated in FIGS. 22 and 23, a plurality of branch blocks 190 are used in Connection Example 3. The branch blocks 190 are made of a resin having an insulating property. In each branch block 190, an insertion hole 192 is formed, through which the main line 21 of the main line harness 11 is inserted to have, therein, the portion of the main line 21 from which the cover 21a has been removed. In an upper portion of the branch block 190, a screw hole 194 communicating with the insertion hole 192 is formed, and a screw 195 is screwed into the screw hole 194. Besides, in the branch block 190, a slit 193 opened on a side surface of the branch block 190 is formed to extend on the side opposite to the screw hole 194. The slit 193 communicates with the insertion hole 192 in a lower portion of the branch block 190.

A connection terminal 197 made of a conductive metal material is connected to the branch line 71 of the branch harness 12 to be connected to the main line 21. The connection terminal 197 is formed in a plate shape. This connection terminal 197 is inserted into the slit 193 of the branch block 190.

In the branch block 190, when the screw 195 is screwed into the screw hole 194, the screw 195 comes into contact with the main line 21 inserted through the insertion hole 192, and the main line 21 is pressed downward. Thus, the main line 21 pressed by the screw 195 is pressed against the connection terminal 197 connected to the branch line 71 and inserted into the slit 193. Accordingly, the branch line 71 is electrically connected to the main line 21 via the connection terminal 197.

In another branch block 190 to be linked to this branch block 190, a link portion 191 protruding in the lengthwise direction of the main line harness 11 is formed. A tenon and a mortis to be mutually engaged are formed on a side surface of the branch block 190 opposite to the slit 193 and on the link portion 191 (see FIG. 21). When the tenon and the mortis are engaged with each other, the plural branch blocks 190 are linked to each other in the arranging direction of the main lines 21.

Also when this branch block 190 is used, the branch block 190 can be attached to necessary one(s) of the plural main lines 21 of the main line harness 11 for connecting the branch line 71 of the branch harness 12 thereto.

It is noted that the present invention is not limited to the above-described embodiments, but can be appropriately modified and improved. In addition, the materials, the shapes, the dimensions, the numbers, the positions and the like of the respective elements described in the aforementioned embodiments are not restrictive but arbitrary as long as the present invention can be practiced.

For example, the case where a round bar is used as each main line 21 disposed in the main line harness 11 is described in the aforementioned embodiments, but the main line 21 is not limited to a round bar but may be a square bar. Incidentally, a round bar can be easily bent in any direction including upward, downward, rightward and leftward directions, and the wound portion 53 is in uniform contact with the circumferential surface thereof in the branching structure of the first embodiment, and therefore, a round bar is preferably used as each main line 21 disposed in the main line harness 11.

Besides, in the branching structures excluding that of Connection Example 1, the connecting portion of the main line 21 may be exposed by removing the precedently provided cover 21a in connecting to the branch line 71, or alternatively, the cover 21a may be provided in a portion excluding the connecting portion in a subsequent step.

Here, the features of the branching structure and the wire harness according to the embodiments of the present invention will be briefly summarized in the following [1] and [2]:

[1] A branching structure for connecting a branch harness (12) to a main line harness, wherein the branch harness (12) includes a plurality of branch lines (71) and the main line harness includes a plurality of main lines (11) arranged in parallel to each other and each made of a wiring member including a bar conductor, the branching structure includes:

connection terminals (50 or 50B) configured to electrically connect the branch lines (71) to the main lines (11) respectively;

a terminal block (35) on which the connection terminals (50 or 50B) are supported; and fasteners (fastening screws 65) that respectively fasten the connection terminals (50 or 50B) onto the terminal block (35), wherein:

each of the connection terminals (50 or 50B) has a belt-shaped wound portion (53) to be wound around a corresponding one of the main lines (11), and the wound portion (53) is fastened by a corresponding one of the fasteners (fastening screws 65) so that both ends of the wound portion (53) come closer to each other and a center portion of the wound portion (53) tightens around the main line so as to be brought into surface contact with the bar conductor of the main line.

[2] A wire harness includes:
control boxes (100A) each of which comprises a control portion and the branching structure described in [1] above;
the main line harness (11) including a power line (21) having a prescribed current capacity and routed on a vehicle body; and
the branch harness (12) configured to be connected to an accessory of a vehicle, wherein:
the control part of each of the control boxes (100A) distributes power of the power line (21) supplied to the main line harness (11) to the branch harness (12) connected to the main line harness (11),
the control boxes (100A) are dispersedly disposed along the main line harness (11), and
each of the control boxes (100A) connects the branch harness (12) to the main line harness (11) by using a corresponding one of the branching structures.

What is claimed is:

1. A branching structure for connecting a branch harness to a main line harness, wherein the branch harness includes a plurality of branch lines and the main line harness includes a plurality of main lines arranged in parallel to each other and each made of a wiring member including a bar conductor, the branching structure comprising:
   connection terminals configured to electrically connect the branch lines to the main lines respectively;
   a terminal block on which the connection terminals are supported; and
   fasteners that respectively fasten the connection terminals onto the terminal block, wherein:
   each of the connection terminals has a belt-shaped wound portion to be wound around a corresponding one of the main lines, and
   the wound portion is fastened by a corresponding one of the fasteners so that both ends of the wound portion come closer to each other and a center portion of the wound portion tightens around the main line so as to be brought into surface contact with the bar conductor of the main line.

2. A wire harness comprising:
   control boxes each of which comprises a control portion and the branching structure according to claim 1;
   a main line harness including a power line having a prescribed current capacity and routed on a vehicle body; and
   a branch harness configured to be connected to an accessory of a vehicle, wherein:
   the control part of each of the control boxes distributes power of the power line supplied to the main line harness to the branch harness connected to the main line harness,
   the control boxes are dispersedly disposed along the main line harness, and
   each of the control boxes connects the branch harness to the main line harness by using a corresponding one of the branching structures.

* * * * *